US009580625B2

(12) United States Patent
Fuchi et al.

(10) Patent No.: US 9,580,625 B2
(45) Date of Patent: Feb. 28, 2017

(54) GAS BARRIER ADHESIVE SHEET, METHOD FOR PRODUCING SAME, ELECTRONIC MEMBER, AND OPTICAL MEMBER

(75) Inventors: Emi Fuchi, Tokyo (JP); Suguru Kenmochi, Tokyo (JP); Satoshi Naganawa, Tokyo (JP); Koichi Nagamoto, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 14/236,494

(22) PCT Filed: Jul. 25, 2012

(86) PCT No.: PCT/JP2012/068778
§ 371 (c)(1),
(2), (4) Date: Mar. 6, 2014

(87) PCT Pub. No.: WO2013/018602
PCT Pub. Date: Feb. 7, 2013

(65) Prior Publication Data
US 2014/0178622 A1 Jun. 26, 2014

(30) Foreign Application Priority Data

Aug. 3, 2011 (JP) .................................. 2011-170061

(51) Int. Cl.
*C09J 7/02* (2006.01)
(52) U.S. Cl.
CPC .......... *C09J 7/0217* (2013.01); *C09J 7/0207* (2013.01); *C09J 2201/622* (2013.01);
(Continued)
(58) Field of Classification Search
None
See application file for complete search history.

(56) References Cited

U.S. PATENT DOCUMENTS 5,414,542 A * 5/1995 Kawagishi .......... G02F 1/13439
349/143
5,795,650 A * 8/1998 Watanabe .............. C09J 7/0217
428/343
(Continued)

FOREIGN PATENT DOCUMENTS

JP 08-179291 A 7/1996
JP 08-234181 A 9/1996
(Continued)

OTHER PUBLICATIONS

International Search Report, issued in PCT/JP2012/068778, dated Oct. 30, 2012.
(Continued)

*Primary Examiner* — Scott R Walshon
(74) *Attorney, Agent, or Firm* — Birch, Stewart, Kolasch & Birch, LLP

(57) ABSTRACT

Provided is a gas barrier pressure-sensitive adhesive sheet having at least one gas barrier layer and at least one pressure-sensitive adhesive layer, the at least one pressure-sensitive adhesive layer having a storage modulus at 23° C. of $1.5 \times 10^4$ to $1.0 \times 10^7$ Pa, and the gas barrier pressure-sensitive adhesive sheet not including a base layer. Also, provided is the following: a gas barrier pressure-sensitive adhesive sheet that makes it possible to easily provide the adherend with a gas barrier capability without significantly increasing the thickness of the gas barrier pressure-sensitive adhesive sheet, does not show delamination (separation) at the interface between the pressure-sensitive adhesive layer and another layer even when subjected to high-temperature/high-humidity conditions, and exhibits excellent bendability, a method for producing the same, an electronic member that includes the gas barrier pressure-sensitive adhesive
(Continued)

sheet, and an optical member that includes the gas barrier pressure-sensitive adhesive sheet.

5 Claims, 1 Drawing Sheet

(52) U.S. Cl.
CPC .... *C09J 2203/318* (2013.01); *C09J 2203/326* (2013.01); *C09J 2400/123* (2013.01); *C09J 2400/163* (2013.01); *C09J 2421/00* (2013.01); *C09J 2433/00* (2013.01); *Y10T 428/1476* (2015.01); *Y10T 428/28* (2015.01); *Y10T 428/2848* (2015.01)

(56) References Cited

U.S. PATENT DOCUMENTS

| | | | |
|---|---|---|---|
| 6,485,826 | B1 | 11/2002 | Watanabe et al. |
| 7,115,320 | B2 * | 10/2006 | Tanaka .................... B32B 27/08 428/337 |
| 8,148,442 | B2 * | 4/2012 | Nagamoto et al. ................ 522/1 |
| 2002/0140890 | A1 * | 10/2002 | Hanada et al. ............... 349/122 |
| 2006/0062995 | A1 * | 3/2006 | Yamamoto .................... 428/332 |
| 2006/0162857 | A1 * | 7/2006 | Nagamoto et al. ......... 156/272.8 |
| 2006/0223938 | A1 * | 10/2006 | Nagamoto .............. C08L 33/04 524/556 |
| 2008/0023132 | A1 | 1/2008 | Sano et al. |
| 2009/0022967 | A1 * | 1/2009 | Inenaga ......................... 428/214 |
| 2010/0003481 | A1 | 1/2010 | Nakabayashi et al. |
| 2010/0015431 | A1 | 1/2010 | Matsui et al. |
| 2010/0209703 | A1 | 8/2010 | Takarada et al. |
| 2011/0052892 | A1 * | 3/2011 | Murakami ............... C08J 7/045 428/213 |
| 2011/0111220 | A1 | 5/2011 | Takarada et al. |
| 2011/0121356 | A1 * | 5/2011 | Krawinkel et al. ........... 257/100 |
| 2012/0064321 | A1 | 3/2012 | Suzuki et al. |

FOREIGN PATENT DOCUMENTS

| | | |
|---|---|---|
| JP | 2000-338901 A | 12/2000 |
| JP | 2001/064608 A | 3/2001 |
| JP | 2003-238911 A | 8/2003 |
| JP | 2011-088356 A | 8/2003 |
| JP | 2008-32852 A | 2/2008 |
| JP | 2009-220496 A | 10/2009 |
| JP | 2010-189545 A | 9/2010 |
| JP | 2011-99073 A | 5/2011 |
| WO | WO 2008/059925 A1 | 5/2008 |
| WO | WO 2010/107018 A1 | 9/2010 |

OTHER PUBLICATIONS

Extended European Search Report issued Jun. 8, 2015, in European Patent Application No. 12819217.6.

Office Action issued Apr. 26, 2016, in Japanese Patent Application No. 2013-526835.

Notification of Reasons for Refusal issued Nov. 30, 2016, in Japanese Patent Application No. 2013-526835, with English translation.

\* cited by examiner

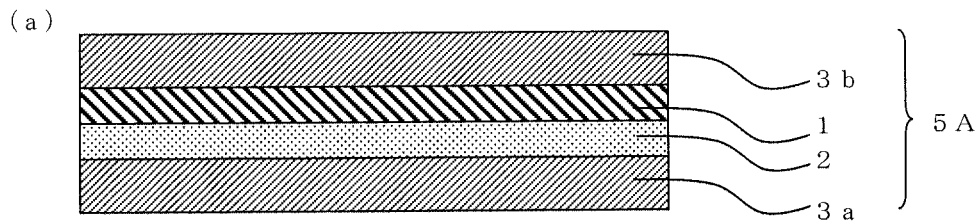
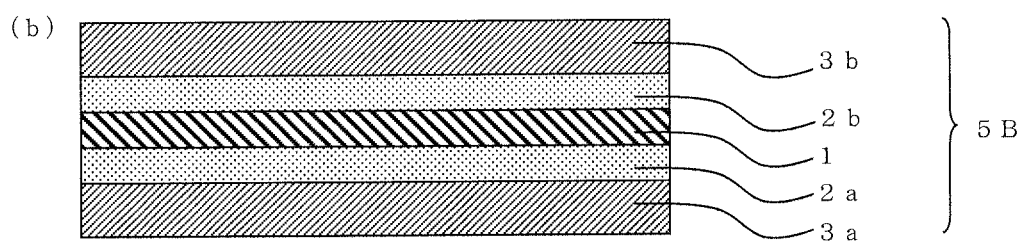
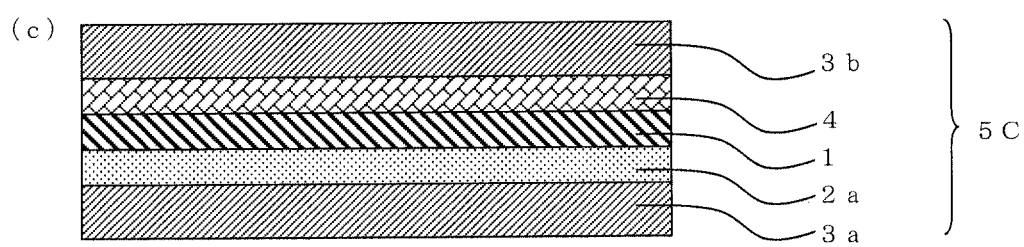
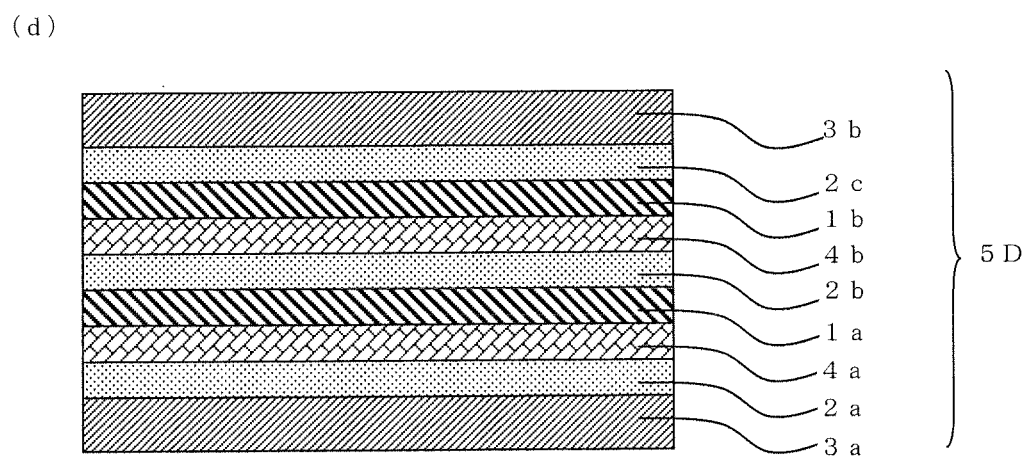

GAS BARRIER ADHESIVE SHEET, METHOD FOR PRODUCING SAME, ELECTRONIC MEMBER, AND OPTICAL MEMBER

TECHNICAL FIELD

The invention relates to a gas barrier pressure-sensitive adhesive sheet that has a small thickness, and exhibits excellent durability, a method for producing the same, an electronic member that includes the gas barrier pressure-sensitive adhesive sheet, and an optical member that includes the gas barrier pressure-sensitive adhesive sheet.

BACKGROUND ART

Use of a transparent plastic film as a substrate of a display (e.g., liquid crystal display or electroluminescence (EL) display) has been studied in order to implement a display that has a reduced thickness, reduced weight, and flexibility.

However, since a plastic film generally allows water vapor, oxygen, and the like to pass through as compared with a glass substrate, the elements provided in a display may easily deteriorate when a transparent plastic film is used as a substrate of a display.

In order to solve the above problem, Patent Document 1 proposes a flexible display substrate in which a transparent gas barrier layer formed of a metal oxide is stacked on the surface of a transparent plastic film using a deposition method, an ion plating method, a sputtering method, or the like.

However, since excessive heat is applied to the plastic substrate when using the method disclosed in Patent Document 1, the optical properties of the plastic substrate may be adversely affected, and a deterioration in transparency may occur.

The above problem may be solved using a transfer laminate that includes a gas barrier layer. For example, Patent Document 2 discloses a method that includes forming a hard coat layer on a heat-resistant support, forming a gas barrier layer on the hard coat layer to obtain a transfer laminate, bonding a base formed of a polymer material to the gas barrier layer of the transfer laminate through an adhesive, and removing the heat-resistant support to obtain a liquid crystal display plastic substrate in which the gas barrier layer and the hard coat layer are stacked on the base formed of a polymer material.

Patent Document 3 discloses a plastic liquid crystal panel transfer foil in which at least one of a hard coat layer and a gas barrier layer and an adhesive layer are sequentially formed on a base film either directly or through a release layer. Patent Document 3 also discloses a method that produces a plastic liquid crystal panel by transferring the transfer foil to a plastic substrate using a heat transfer method.

However, the transfer laminates disclosed in Patent Documents 2 and 3 have a problem in that the gas barrier layer may be removed from the adhesive layer, or blisters or lifting may occur between the gas barrier layer and the adhesive layer when the transfer laminate is rolled (curved) or bent. Moreover, lifting may occur at the interface between the adhesive layer and the adherend (e.g., plastic substrate), and the transfer laminate may be removed from the adherend when the transfer laminate is bonded to the adherend, and subjected to high-temperature/high-humidity conditions.

RELATED-ART DOCUMENT

Patent Document

Patent Document 1: JP-A-2000-338901
Patent Document 2: JP-A-8-179291
Patent Document 3: JP-A-8-234181

SUMMARY OF THE INVENTION

Technical Problem

The invention was conceived in view of the above situation. An object of the invention is to provide a gas barrier pressure-sensitive adhesive sheet that makes it possible to easily provide the adherend with a gas barrier capability without significantly increasing the thickness of the gas barrier pressure-sensitive adhesive sheet, does not show delamination (separation) at the interface between the pressure-sensitive adhesive layer and another layer even when subjected to high-temperature/high-humidity conditions, and exhibits excellent bendability, a method for producing the same, an electronic member that includes the gas barrier pressure-sensitive adhesive sheet, and an optical member that includes the gas barrier pressure-sensitive adhesive sheet.

Solution to Problem

The inventors of the invention conducted extensive studies on a gas barrier pressure-sensitive adhesive sheet that includes a gas barrier layer and a pressure-sensitive adhesive layer. As a result, the inventors found that a gas barrier pressure-sensitive adhesive sheet that exhibits an excellent gas barrier capability, bendability, heat resistance, and humidity resistance can be obtained without providing a base layer (i.e., without significantly increasing the thickness of the gas barrier pressure-sensitive adhesive sheet) by utilizing a pressure-sensitive adhesive layer that has a storage modulus within a specific range. This finding has led to the completion of the invention.

A first aspect of the invention provides the following gas barrier pressure-sensitive adhesive sheet (see (1) to (5)).

(1) A gas barrier pressure-sensitive adhesive sheet including at least one gas barrier layer and at least one pressure-sensitive adhesive layer, the at least one pressure-sensitive adhesive layer having a storage modulus at 23° C. of $1.5 \times 10^4$ to $1.0 \times 10^7$ Pa, and the gas barrier pressure-sensitive adhesive sheet not including a base layer.

(2) The gas barrier pressure-sensitive adhesive sheet according to (1), the gas barrier pressure-sensitive adhesive sheet having a water vapor transmission rate at a temperature of 40° C. and a relative humidity of 90% of 0.1 $g/m^2/day$ or less.

(3) The gas barrier pressure-sensitive adhesive sheet according to (1), wherein the at least one pressure-sensitive adhesive layer has a storage modulus at 80° C. of $8.0 \times 10^3$ to $1.0 \times 10^6$ Pa.

(4) The gas barrier pressure-sensitive adhesive sheet according to (1), the gas barrier pressure-sensitive adhesive sheet having a substantial thickness of 0.5 to 50

(5) The gas barrier pressure-sensitive adhesive sheet according to (1), wherein the at least one pressure-sensitive adhesive layer is formed of a pressure-sensitive adhesive that includes a silane coupling agent or an alkoxy metal compound.

(6) The gas barrier pressure-sensitive adhesive sheet according to (1), further including a protective layer.
(7) The gas barrier pressure-sensitive adhesive sheet according to (1), further including a release sheet.
(8) The gas barrier pressure-sensitive adhesive sheet according to (1), the gas barrier pressure-sensitive adhesive sheet being a pressure-sensitive adhesive sheet for an electronic member or an optical member.

A second aspect of the invention provides the following method for producing a gas barrier pressure-sensitive adhesive sheet (see (9) and (10)).
(9) A method for producing the gas barrier pressure-sensitive adhesive sheet according to any one of (1) to (8), the method including forming a pressure-sensitive adhesive layer or a gas barrier layer on a release side of a release sheet.
(10) A method for producing the gas barrier pressure-sensitive adhesive sheet according to any one of (1) to (8), the method including:
a step 1 that forms a gas barrier layer on a release side of a first release sheet to obtain a release sheet provided with the gas barrier layer;
a step 2 that forms a pressure-sensitive adhesive layer on a release side of a second release sheet to obtain a release sheet provided with the pressure-sensitive adhesive layer; and
a step 3 that bonds the release sheet provided with the gas barrier layer and the release sheet provided with the pressure-sensitive adhesive layer so that the gas barrier layer and the pressure-sensitive adhesive layer face each other.

A third aspect of the invention provides the following electronic member or optical member (see (11)).
(11) An electronic member or an optical member including the gas barrier pressure-sensitive adhesive sheet according to any one of (1) to (8).

Advantageous Effects of the Invention

The gas barrier pressure-sensitive adhesive sheet according to the first aspect of the invention exhibits an excellent gas barrier capability, and makes it possible to provide the adherend with a gas barrier capability without significantly increasing the thickness of the gas barrier pressure-sensitive adhesive sheet.

Since the gas barrier pressure-sensitive adhesive sheet according to the first aspect of the invention exhibits excellent durability (i.e., bendability, heat resistance, and humidity resistance), delamination (separation) rarely occurs at the interface between the pressure-sensitive adhesive layer and another layer, and blisters or lifting rarely occur even when the gas barrier pressure-sensitive adhesive sheet is rolled (curved) or bent, or subjected to high-temperature/high-humidity conditions.

The method for producing a gas barrier pressure-sensitive adhesive sheet according to the second aspect of the invention can efficiently produce the gas barrier pressure-sensitive adhesive sheet according to the first aspect of the invention.

Since the electronic member or the optical member according to the third aspect of the invention includes the gas barrier pressure-sensitive adhesive sheet according to the first aspect of the invention, the electronic member or the optical member exhibits an excellent gas barrier capability, and has a reduced weight and thickness.

Moreover, since the gas barrier capability rarely deteriorates even when the electronic member or the optical member is rolled (curved) or bent, or used under high-temperature/high-humidity conditions, a deterioration in the device and the like rarely occurs.

BRIEF DESCRIPTION OF DRAWINGS

FIG. 1 is a cross-sectional view illustrating examples of a gas barrier pressure-sensitive adhesive sheet according to one embodiment of the invention.

DESCRIPTION OF EMBODIMENTS

A gas barrier pressure-sensitive adhesive sheet, a method for producing a gas barrier pressure-sensitive adhesive sheet, and an electronic member or an optical member that includes a gas barrier pressure-sensitive adhesive sheet according to several exemplary embodiments of the invention are described in detail below.

1) Gas Barrier Pressure-Sensitive Adhesive Sheet

A gas barrier pressure-sensitive adhesive sheet according to one embodiment of the invention includes at least one gas barrier layer and at least one pressure-sensitive adhesive layer, the at least one pressure-sensitive adhesive layer having a storage modulus at 23° C. of $1.5 \times 10^4$ to $1.0 \times 10^7$ Pa, and the gas barrier pressure-sensitive adhesive sheet not including a base layer.

Note that the term "sheet" used herein includes a strip-like sheet and a long (belt-like) sheet.

Gas Barrier Layer

The gas barrier layer included in the gas barrier pressure-sensitive adhesive sheet according to one embodiment of the invention refers to a layer that exhibits a capability to suppress transmission (penetration) of oxygen and water vapor (hereinafter may be referred to as "gas barrier capability").

The gas barrier layer included in the gas barrier pressure-sensitive adhesive sheet according to one embodiment of the invention normally has a water vapor transmission rate at a temperature of 40° C. and a relative humidity of 90% of 1.0 g/m$^2$/day or less, preferably 0.8 g/m$^2$/day or less, more preferably 0.5 g/m$^2$/day or less, and still more preferably 0.1 g/m$^2$/day or less. The water vapor transmission rate of the gas barrier layer is substantially considered to be the water vapor transmission rate of the pressure-sensitive adhesive sheet. The water vapor transmission rate of the pressure-sensitive adhesive sheet may be measured using a known gas transmission rate measurement apparatus. Specifically, the water vapor transmission rate of the pressure-sensitive adhesive sheet may be measured by the method described later in connection with the examples.

The thickness of the gas barrier layer is normally 10 to 2000 nm, preferably 20 to 1000 nm, more preferably 30 to 500 nm, and still more preferably 40 to 200 nm, from the viewpoint of gas barrier capability and handling capability.

A material for forming the gas barrier layer and the like are not particularly limited as long as the gas barrier layer exhibits a gas barrier capability. Examples of the gas barrier layer include a gas barrier layer that is formed of an inorganic deposited film, a gas barrier layer that includes a gas barrier resin, a gas barrier layer obtained by implanting ions into a layer that includes a polymer compound, and the like.

It is preferable that the gas barrier layer be a gas barrier layer that is formed of an inorganic deposited film, or a gas barrier layer obtained by implanting ions into a layer that includes a polymer compound, since it is possible to efficiently form a layer that is thin, and exhibits an excellent gas barrier capability.

Examples of the inorganic deposited film include a film obtained by depositing an inorganic compound, and a film obtained by depositing a metal.

Examples of the inorganic compound used as a raw material for forming the inorganic deposited film include inorganic oxides such as silicon oxide, aluminum oxide, magnesium oxide, zinc oxide, indium oxide, and tin oxide; inorganic nitrides such as silicon nitride, aluminum nitride, and titanium nitride; inorganic carbides; inorganic sulfides; inorganic oxynitride such as silicon oxynitride; inorganic oxycarbides; inorganic carbonitrides; inorganic oxycarbonitrides; and the like.

Examples of the metal used as a raw material for forming the inorganic deposited film include aluminum, magnesium, zinc, tin, and the like.

These raw materials may be used either alone or in combination.

It is preferable to use an inorganic deposited film formed using an inorganic oxide, an inorganic nitride, or a metal as the raw material from the viewpoint of gas barrier capability. It is preferable to use an inorganic deposited film formed using an inorganic oxide or an inorganic nitride as the raw material from the viewpoint of transparency. The inorganic deposited film may be a single-layer film, or may be a multilayer film.

The thickness of the inorganic deposited film is preferably 10 to 2000 nm, more preferably 20 to 1000 nm, still more preferably 30 to 500 nm, and yet more preferably 40 to 200 nm, from the viewpoint of gas barrier capability and handling capability.

The inorganic deposited film may be formed by a PVD method such as a vacuum deposition method, a sputtering method, or an ion plating method, or a CVD method such as a thermal CVD method, a plasma CVD method, or a photo-CVD method, for example.

Examples of the gas barrier resin include resins that allow oxygen, water vapor, and the like to pass through to only a small extent, such as polyvinyl alcohol, a partially saponified product thereof, an ethylene-vinyl alcohol copolymer, polyacrylonitrile, polyvinyl chloride, polyvinylidene chloride, and polychlorotrifluoroethylene.

The thickness of the gas barrier layer that includes the gas barrier resin is preferably 10 to 2000 nm, more preferably 20 to 1000 nm, still more preferably 30 to 500 nm, and yet more preferably 40 to 200 nm, from the viewpoint of gas barrier capability.

The gas barrier layer that includes the gas barrier resin may be formed by applying a solution that includes the gas barrier resin to a specific layer to form a film, and appropriately drying the film.

The solution that includes the gas barrier resin may be applied by an arbitrary known coating method (e.g., spin coating method, spray coating method, bar coating method, knife coating method, roll coating method, blade coating method, die coating method, or gravure coating method), for example.

The film formed by applying the solution that includes the gas barrier resin may be dried using a known drying method such as hot-air drying, heat roll drying, or infrared irradiation.

Examples of the polymer compound used when forming the gas barrier layer by implanting ions into a layer that includes a polymer compound include silicon-based polymer compounds, polyimides, polyamides, polyamideimides, polyphenylene ethers, polyether ketones, polyether ether ketones, polyolefins, polyesters, polycarbonates, polysulfones, polyether sulfones, polyphenylene sulfides, polyallylates, acrylic resins, cycloolefin-based polymers, aromatic polymers, combinations of two or more polymers among these polymers, and the like. Among these, silicon-based polymer compounds are preferable.

Examples of a layer that includes a silicon-based polymer compound include a layer obtained using a polysilazane compound, a polycarbosilane compound, a polysilane compound, a polyorganosiloxane compound, or the like (see JP-A-10-245436, JP-T-2003-514822, JP-A-2005-36089, JP-A-2008-63586, JP-A-2009-235358, JP-A-2009-286891, JP-A-2010-106100, JP-A-2010-229445, JP-A-2010-232569, and JP-A-2010-238736, for example).

The layer that includes the polymer compound may be formed in the same manner as the gas barrier layer formed of the inorganic deposited film or the gas barrier layer that includes the gas barrier resin depending on the raw material.

The thickness of the layer that includes the polymer compound is preferably 10 to 2000 nm, more preferably 20 to 1000 nm, still more preferably 30 to 500 nm, and yet more preferably 40 to 200 nm, from the viewpoint of gas barrier capability and handling capability.

Examples of ions to be implanted into the layer that includes the polymer compound include ions of a rare gas (e.g., argon, helium, neon, krypton, and xenon); ions of a fluorocarbon, hydrogen, nitrogen, oxygen, carbon dioxide, chlorine, fluorine, and sulfur; ions of a metal (e.g., gold, silver, copper, platinum, nickel, palladium, chromium, titanium, molybdenum, niobium, tantalum, tungsten, and aluminum); and the like.

It is preferable to use ions of at least one element selected from the group consisting of hydrogen, nitrogen, oxygen, argon, helium, neon, xenon, and krypton from the viewpoint of ease of implantation and a capability to form a gas barrier layer that exhibits an excellent gas barrier capability and transparency.

The ion implantation dose and the thickness of the ion implantation target area may be appropriately determined taking account of the thickness of the gas barrier layer, the intended use of the gas barrier pressure-sensitive adhesive sheet, and the like.

The thickness of the ion implantation target area is normally 10 to 1000 nm, and preferably 10 to 200 nm, from the ion implantation target surface. The thickness of the ion implantation target area may be controlled by appropriately determining the type of ions and the implantation conditions (e.g., applied voltage and implantation time).

Ions may be implanted by applying ions (ion beams) accelerated by applying an electric field, or may be implanted by implanting ions present in plasma (plasma ion implantation method), for example. It is preferable to use the plasma ion implantation method since a gas barrier pressure-sensitive adhesive sheet that exhibits an excellent gas barrier capability and the like can be easily obtained.

The plasma ion implantation method may be implemented by generating plasma in an atmosphere containing a plasma-generating gas, and implanting ions (cations) present in the plasma into the surface area of the layer that includes the polymer compound by applying a negative high-voltage pulse to the layer that includes the polymer compound, for example.

Pressure-Sensitive Adhesive Layer

The pressure-sensitive adhesive layer included in the gas barrier pressure-sensitive adhesive sheet according to one embodiment of the invention has a storage modulus at 23°

C. of $1.5 \times 10^4$ to $1.0 \times 10^7$ Pa, preferably $5.0 \times 10^4$ to $1.0 \times 10^7$ Pa, and more preferably $6.0 \times 10^4$ to $1.0 \times 10^6$ Pa.

If the storage modulus of the pressure-sensitive adhesive layer at 23° C. is less than $1.5 \times 10^4$ Pa, the pressure-sensitive adhesive layer may show a decrease in adhesion, bendability, heat resistance, and humidity resistance. As a result, delamination (separation) may easily occur at the interface between the pressure-sensitive adhesive layer and another layer when the gas barrier pressure-sensitive adhesive sheet, or an electronic member or an optical member that includes the gas barrier pressure-sensitive adhesive sheet, is rolled (curved) or bent.

If the storage modulus of the pressure-sensitive adhesive layer at 23° C. exceeds $1.0 \times 10^7$ Pa, the pressure-sensitive adhesive layer may not exhibit sufficient tack and adhesion. In this case, it may be difficult to bond the gas barrier pressure-sensitive adhesive sheet to the adherend. Moreover, cracks may occur in the pressure-sensitive adhesive layer (i.e., the pressure-sensitive adhesive layer may show a decrease in bendability) when the gas barrier pressure-sensitive adhesive sheet is rolled (curved) or bent.

It is preferable that the pressure-sensitive adhesive layer have a storage modulus at 80° C. of $8.0 \times 10^3$ to $1.0 \times 10^6$ Pa, more preferably $1.0 \times 10^4$ to $8.0 \times 10^5$ Pa, and still more preferably $2.0 \times 10^4$ to $5.0 \times 10^5$ Pa.

When the storage modulus of the pressure-sensitive adhesive layer at 80° C. is within the above range, it is possible to prevent a situation in which the pressure-sensitive adhesive layer undergoes interfacial delamination (separation) when the gas barrier pressure-sensitive adhesive sheet, or an electronic member or an optical member that includes the gas barrier pressure-sensitive adhesive sheet, is subjected to high-temperature conditions, high-humidity conditions, or the like.

The term "storage modulus" used herein in connection with the pressure-sensitive adhesive layer refers to a value measured by a torsional shear method (frequency: 1 Hz) in accordance with JIS K 7244 using a dynamic viscoelastometer.

The thickness of the pressure-sensitive adhesive layer may be appropriately selected taking account of the intended use of the gas barrier pressure-sensitive adhesive sheet and the like. The thickness of the pressure-sensitive adhesive layer is normally 0.1 to 1000 μm, preferably 0.5 to 500 μm, more preferably 1 to 100 μm, and still more preferably 1 to 10 μm.

When the thickness of the pressure-sensitive adhesive layer is 0.1 μm or more, a gas barrier pressure-sensitive adhesive sheet that exhibits sufficient adhesion can be obtained. When the thickness of the pressure-sensitive adhesive layer is 1000 μm or less, the gas barrier pressure-sensitive adhesive sheet exhibits excellent bendability, and the productivity and the handling capability of the gas barrier pressure-sensitive adhesive sheet are improved.

The glass transition temperature (Tg) of a polymer component included in the pressure-sensitive adhesive is preferably −50 to +10° C., more preferably −40 to +10° C., and still more preferably −10 to 0° C.

When the glass transition temperature of the polymer component is within the above range, a pressure-sensitive adhesive layer that exhibits tack at room temperature can be easily obtained, and the resulting gas barrier pressure-sensitive adhesive sheet can be easily bonded to the adherend at a temperature around room temperature. This makes it unnecessary to heat the gas barrier pressure-sensitive adhesive sheet during bonding, and makes it possible to prevent a situation in which the transparency of the electronic member or the optical member decreases, or the adherend warps due to heating.

The mass average molecular weight (Mw) of the polymer component included in the pressure-sensitive adhesive is normally 100,000 to 3,000,000, preferably 200,000 to 2,000,000, and more preferably 500,000 to 2,000,000.

When the mass average molecular weight (Mw) of the polymer component is within the above range, it is possible to easily obtain a pressure-sensitive adhesive layer that exhibits adhesion and cohesive force in a well-balanced manner, and exhibits a sufficient anchor effect on the adherend while maintaining flexibility. This makes it possible to obtain a gas barrier pressure-sensitive adhesive sheet that exhibits more excellent durability (i.e., bendability, heat resistance, and humidity resistance), and more excellent adhesion to the adherend.

The molecular weight distribution (Mw/Mn) of the polymer component included in the pressure-sensitive adhesive is preferably 1.0 to 5.0, and more preferably 2.0 to 4.5.

When the molecular weight distribution (Mw/Mn) of the polymer component is 5.0 or less (i.e., the content of low-molecular-weight components is small), it is possible to obtain a gas barrier pressure-sensitive adhesive sheet that exhibits more excellent bendability and heat/humidity resistance.

Note that the terms "mass average molecular weight (Mw)" and "molecular weight distribution (Mw/Mn)" used herein refer to values determined by gel permeation chromatography (GPC) relative to a polystyrene standard (polystyrene-reduced values).

The polymer component included in the pressure-sensitive adhesive is not particularly limited as long as the desired pressure-sensitive adhesive layer can be formed. Examples of a pressure-sensitive adhesive that includes such a polymer component include known pressure-sensitive adhesives such as an acrylic-based pressure-sensitive adhesive, a rubber-based pressure-sensitive adhesive, a polyurethane-based pressure-sensitive adhesive, and a silicone-based pressure-sensitive adhesive. Among these, the acrylic-based pressure-sensitive adhesive is preferable from the viewpoint of adhesion and handling capability.

Examples of the acrylic-based pressure-sensitive adhesive include pressure-sensitive adhesives that include a (meth)acrylate-based (co)polymer as the main component.

Examples of the (meth)acrylate-based (co)polymer include a (meth)acrylate homopolymer, a copolymer that includes two or more (meth)acrylate units, and a copolymer of a (meth)acrylate and an additional monomer.

The (meth)acrylate-based copolymer may be a random copolymer, a block copolymer, or a graft copolymer.

These (meth)acrylate-based (co)polymers may be used either alone or in combination.

Note that the term "(meth)acrylic acid" used herein refers to acrylic acid or methacrylic acid, and the term "(co) polymer" used herein refers to a homopolymer or a copolymer.

Examples of the (meth)acrylate-based monomer used when synthesizing the (meth)acrylate-based (co)polymer include alkyl(meth)acrylates wherein the number of carbon atoms of the alkyl group is 1 to 20.

Specific examples of the alkyl(meth)acrylates include methyl(meth)acrylate, ethyl(meth)acrylate, propyl(meth) acrylate, isopropyl(meth)acrylate, n-butyl(meth)acrylate, isobutyl(meth)acrylate, t-butyl(meth)acrylate, pentyl(meth) acrylate, hexyl(meth)acrylate, cyclohexyl(meth)acrylate, 2-ethylhexyl(meth)acrylate, iso-octyl(meth)acrylate, decyl (meth)acrylate, dodecyl(meth)acrylate, myristyl(meth)acrylate, palmityl(meth)acrylate, stearyl(meth)acrylate, and the like.

Examples of an additional monomer used when synthesizing a copolymer of a (meth)acrylate and an additional monomer include monomers that include a crosslinkable functional group (e.g., hydroxyl group, carboxyl group, or amino group); vinyl esters such as vinyl acetate and vinyl propionate; olefins such as ethylene, propylene, and isobutylene; halogenated olefins such as vinyl chloride and vinylidene chloride; dienes such as butadiene, isoprene, and chloroprene; nitrile-based monomers such as acrylonitrile and methacrylonitrile; acrylamides such as acrylamide, N-methylacrylamide, and N,N-dimethylacrylamide; and the like.

Examples of the monomers that include a crosslinkable functional group include hydroxyalkyl(meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, and 4-hydroxybutyl(meth)acrylate; monoalkylaminoalkyl(meth)acrylates such as monomethylaminoethyl(meth)acrylate, monoethylaminoethyl(meth)acrylate, monomethylaminopropyl(meth)acrylate, and monoethylaminopropyl(meth)acrylate; ethylenically unsaturated carboxylic acids such as acrylic acid, methacrylic acid, crotonic acid, maleic acid, itaconic acid, and citraconic acid; and the like.

These monomers may be used either alone or in combination.

The content of repeating units derived from the additional monomer in the (meth)acrylate-based (co)polymer is preferably 0.01 to 10 mass %, and more preferably 0.05 to 7.0 mass %, based on the total repeating units.

When the content of repeating units derived from the additional monomer is 0.01 mass % or more, sufficient crosslinking occurs through the reaction with a crosslinking agent (described later), and a pressure-sensitive adhesive layer that exhibits more excellent durability can be obtained. When the content of repeating units derived from the additional monomer is 10 mass % or less, the degree of crosslinking does not increase to a large extent, and a pressure-sensitive adhesive layer that exhibits sufficient adhesion to the adherend can be obtained.

The (meth)acrylate-based (co)polymer may be produced by a known polymerization method such as a solution polymerization method, an emulsion polymerization method, or a suspension polymerization method.

A crosslinking agent may be used when using a (meth)acrylate-based (co)polymer that includes a crosslinkable functional group as the pressure-sensitive adhesive component.

Examples of the crosslinking agent include isocyanate-based crosslinking agents such as tolylene diisocyanate, hexamethylene diisocyanate, trimethylolpropanetolylene diisocyanate, and adducts thereof; epoxy-based crosslinking agents such as ethylene glycol glycidyl ether; aziridine-based crosslinking agents such as hexa[1-(2-methyl)-aziridinyl]triphosphatriazine; chelate-based crosslinking agents such as aluminum chelates; and the like.

These crosslinking agents may be used either alone or in combination.

The crosslinking agent is normally used in an amount of 0.01 to 10 parts by mass, and preferably 0.05 to 5 parts by mass, based on 100 parts by mass of the (meth)acrylate-based (co)polymer.

Examples of the rubber-based pressure-sensitive adhesive include a natural rubber; a modified natural rubber-based pressure-sensitive adhesive obtained by graft polymerization of a natural rubber and one or two or more monomers selected from an alkyl(meth)acrylate, styrene, and (meth)acrylonitrile; a rubber-based pressure-sensitive adhesive formed of an isoprene rubber, a styrene-butadiene rubber, an acrylonitrile-butadiene rubber, a methyl methacrylate-butadiene rubber, a urethane rubber, a polyisobutylene resin, or a polybutene resin; and the like. Among these, a polyisobutylene resin is preferable.

Examples of the silicone-based pressure-sensitive adhesive include a pressure-sensitive adhesive that includes dimethylsiloxane as the main component.

The pressure-sensitive adhesive used in connection with the embodiments of the invention may include an active energy ray-curable compound. When the pressure-sensitive adhesive includes the active energy ray-curable compound, the storage modulus of the pressure-sensitive adhesive layer at a high temperature (80° C.) rarely decreases, and it is possible to more effectively prevent a situation in which the pressure-sensitive adhesive layer undergoes interfacial delamination (separation) when the gas barrier pressure-sensitive adhesive sheet, or an electronic member or an optical member that includes the gas barrier pressure-sensitive adhesive sheet, is subjected to high-temperature conditions or high-humidity conditions.

Examples of the active energy ray-curable compound include polyfunctional (meth)acrylate-based monomers, active energy ray-curable acrylate-based oligomers, adduct acrylate-based polymers in which a group that includes a (meth)acryloyl group is introduced into the side chain, and the like.

These active energy ray-curable compounds may be used either alone or in combination.

Examples of the polyfunctional (meth)acrylate-based monomers include bifunctional (meth)acrylate-based monomers such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloyloxyethyl)isocyanurate, and allylated cyclohexyl di(meth)acrylate; trifunctional (meth)acrylate-based monomers such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, and tris(acryloyloxyethyl)isocyanurate; tetrafunctional (meth)acrylate-based monomers such as diglycerol tetra(meth)acrylate and pentaerythritol tetra(meth)acrylate; pentafunctional (meth)acrylate-based monomers such as propionic acid-modified dipentaerythritol penta(meth)acrylate; hexafunctional (meth)acrylate-based monomers such as dipentaerythritol hexa(meth)acrylate and caprolactone-modified dipentaerythritol hexa(meth)acrylate; and the like.

These polyfunctional (meth)acrylate-based monomers may be used either alone or in combination.

Among these, polyfunctional (meth)acrylate-based monomers that include a cyclic structure in the molecule are preferable. The cyclic structure may be a carbocyclic structure or a heterocyclic structure, and may be a monocyclic structure or a polycyclic structure.

Examples of the polyfunctional (meth)acrylate-based monomers that include a cyclic structure in the molecule include polyfunctional (meth)acrylate-based monomers that include an isocyanurate structure, such as di(acryloyloxyethyl) isocyanurate and tris(acryloyloxyethyl) isocyanurate; dimethyloldicyclopentane diacrylate; ethylene oxide-modified hexahydrophthalic acid diacrylate; tricyclodecanedimethanol acrylate; neopentyl glycol-modified trimethylolpropane diacrylate; adamantane diacrylate; and the like.

The molecular weight of the polyfunctional (meth)acrylate-based monomers is preferably less than 1000.

Examples of the active energy ray-curable acrylate-based oligomers include polyester acrylate-based oligomers, epoxy acrylate-based oligomers, urethane acrylate-based oligomers, polyol acrylate-based oligomers, polybutadiene acrylate-based oligomers, silicone acrylate-based oligomers, and the like.

Examples of the polyester acrylate-based oligomers include a compound obtained by esterifying the hydroxyl groups of a polyester oligomer with (meth)acrylic acid, the polyester oligomer being obtained by condensation of a polycarboxylic acid and a polyhydric alcohol and having a hydroxyl group at each end, a compound obtained by esterifying the end hydroxyl groups of an oligomer with (meth)acrylic acid, the oligomer being obtained by adding an alkylene oxide to a polycarboxylic acid, and the like.

Examples of the epoxy acrylate-based oligomers include a compound obtained by reacting (meth)acrylic acid with the oxirane ring of a bisphenol-type epoxy resin or a novolac-type epoxy resin having a relatively low molecular weight to effect esterification, and the like.

It is also possible to use a carboxyl-modified epoxy acrylate oligomer obtained by partially modifying the above epoxy acrylate-based oligomer with a dibasic carboxylic anhydride.

Examples of the urethane acrylate-based oligomers include a compound obtained by esterifying a polyurethane oligomer with (meth)acrylic acid, the polyurethane oligomer being obtained by reacting a polyether polyol or a polyester polyol with a polyisocyanate, and the like.

Examples of the polyol acrylate-based oligomers include a compound obtained by esterifying the hydroxyl groups of a polyether polyol with (meth)acrylic acid, and the like.

Examples of the polybutadiene acrylate-based oligomers include an acrylate-based oligomer obtained by introducing an acrylate group into the end or the side chain of a polybutadiene oligomer.

Examples of the silicone acrylate-based oligomers include an acrylate-based oligomer that includes a polysiloxane bond in the main chain.

These acrylate-based oligomers may be used either alone or in combination.

The mass average molecular weight (Mw) of the acrylate-based oligomers is preferably 50,000 or less, more preferably 500 to 50,000, and still more preferably 3000 to 40,000. Note that the mass average molecular weight (Mw) of the acrylate-based oligomers refers to a value determined by gel permeation chromatography (GPC) relative to a polystyrene standard (polystyrene-reduced value).

The adduct acrylate-based polymers in which a group that includes a (meth)acryloyl group is introduced into the side chain may be obtained by reacting a compound that includes a (meth)acryloyl group and a group that reacts with a crosslinkable functional group with some crosslinkable functional groups of a copolymer of a (meth)acrylate and a monomer that includes a crosslinkable functional group in the molecule (mentioned above in connection with the (meth)acrylate-based (co)polymer).

The mass average molecular weight (Mw) of the adduct acrylate-based polymers is preferably 100,000 to 2,000,000.

Note that the mass average molecular weight (Mw) of the adduct acrylate-based polymers refers to a value determined by gel permeation chromatography (GPC) relative to a polystyrene standard (polystyrene-reduced value).

The mass ratio (resin component:active energy ray-curable compound) of the resin component to the active energy ray-curable compound is preferably 100:1 to 100:100, more preferably 100:5 to 100:50, and still more preferably 100:10 to 100:20.

The pressure-sensitive adhesive that includes the active energy ray-curable compound may optionally include a photoinitiator.

Examples of the photoinitiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxyl-2-propyl) ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanethone, 2-chlorothioxanthone, 2,4-dimethylthioxanethone, 2,4-diethylthioxanthone, benzyl dimethyl ketal, acetophenone dimethyl ketal, p-dimethylaminobenzoates, oligo[2-hydroxy-2-methyl-1[4-(1-methyl)vinyl)phenyl]propanone], 2,4,6-trimethylbenzoyldiphenylphosphine oxide, and the like.

These photoinitiators may be used either alone or in combination.

The photoinitiator is normally used in an amount of 0.2 to 20 parts by mass based on 100 parts by mass of the active energy ray-curable compound.

Examples of active energy rays to be applied include UV rays, electron beams, and the like. Among these, UV rays are preferable.

UV rays may be applied using a high-pressure mercury lamp, an electrodeless lamp, a xenon lamp, or the like. The intensity is normally 50 to 1000 $mW/cm^2$, and the dose is normally 50 to 3000 $mJ/cm^2$.

The irradiation time is normally 0.1 to 1000 seconds, preferably 1 to 500 seconds, and more preferably 10 to 100 seconds. UV rays may be applied a plurality of times so that the dose falls within the above range taking account of the thermal load during the UV irradiation step.

Electron beams may be applied using an electron beam accelerator or the like. The dose is normally 10 to 1000 krad.

The irradiation time is normally 0.1 to 1000 seconds, preferably 1 to 500 seconds, and more preferably 10 to 100 seconds.

Note that the pressure-sensitive adhesive layer may be formed without adding a photoinitiator when using electron beams.

The pressure-sensitive adhesive used in connection with the embodiments of the invention may include a silane coupling agent, an alkoxy metal compound, or the like.

When the pressure-sensitive adhesive includes the silane coupling agent or the alkoxy metal compound, adhesion between the pressure-sensitive adhesive layer and the gas barrier layer, and adhesion between the pressure-sensitive adhesive layer and the adherend are improved when a silicon-containing compound is used as the material for forming the gas barrier layer, or when the adherend is a glass surface.

Examples of the silane coupling agent include polymerizable unsaturated group-containing silicon compounds such as vinyltrimethoxysilane, vinyltriethoxysilane, and methacryloxypropyltrimethoxysilane; silicon compounds having an epoxy structure, such as 3-glycidoxypropyltrimethoxysilane and 2-(3,4-epoxycyclohexyl)ethyltrimethoxysilane; amino group-containing silicon compounds such as 3-aminopropyltrimethoxysilane, N-(2-aminoethyl)-3-aminopropyltrimethoxysilane, and N-(2-aminoethyl)-3-aminopropylmethyldimethoxysilane; 3-chloropropyltrimethoxysilane; and the like.

Examples of the alkoxy metal compound include a titanate-based coupling agent, an aluminate-based coupling agent, a zirconium-based coupling agent, and the like.

These compounds may be used either alone or in combination.

The silane coupling agent or the alkoxy metal compound is preferably added in an amount of 0.001 to 10 parts by mass, and more preferably 0.005 to 5 parts by mass, based on 100 parts by mass (on a solid basis) of the pressure-sensitive adhesive.

The pressure-sensitive adhesive used in connection with the embodiments of the invention may further include various additives. Examples of the additives include a light stabilizer, an antioxidant, a tackifier, a plasticizer, a UV absorber, a coloring agent, a resin stabilizer, a filler, a pigment, an extender, an antistatic agent, and the like.

The pressure-sensitive adhesive layer may be formed by an arbitrary method. The pressure-sensitive adhesive layer may be formed by a known method.

For example, the pressure-sensitive adhesive layer may be formed by applying a pressure-sensitive adhesive layer-forming solution that includes the pressure-sensitive adhesive and an optional solvent or the like using a known coating method to form a film, drying the film, and optionally applying heat or active energy rays to the dried film.

The pressure-sensitive adhesive layer-forming solution may be applied, and the film may be dried using the methods mentioned above in connection with the gas barrier layer.

Gas Barrier Pressure-Sensitive Adhesive Sheet

The gas barrier pressure-sensitive adhesive sheet according to one embodiment of the invention includes at least one gas barrier layer and at least one pressure-sensitive adhesive layer, the at least one pressure-sensitive adhesive layer having a storage modulus at 23° C. of $1.5 \times 10^4$ to $1.0 \times 10^7$ Pa, and the gas barrier pressure-sensitive adhesive sheet not including a base layer.

The term "base layer" used herein refers to a film-like material that is used to support the gas barrier layer, the pressure-sensitive adhesive layer, and the like that are stacked thereon. Specifically, the term "base layer" used herein refers to paper or a plastic film having a thickness of 10 μm or more (requirement 1), a plastic film having a tensile modulus at 23° C. of 200 to 5000 MPa (requirement 2), and the like. The base layer can be handled in a state of a single layer, and functions as a support for the gas barrier layer, the pressure-sensitive adhesive layer, and the like.

The expression "the gas barrier pressure-sensitive adhesive sheet not including a base layer" used herein means that each layer (excluding a release sheet) included in the gas barrier pressure-sensitive adhesive sheet does not satisfy the requirements 1 and 2. An additional layer described later does not fall under the term "base layer".

The expression "the gas barrier pressure-sensitive adhesive sheet not including a base layer" used herein more specifically means that the gas barrier pressure-sensitive adhesive sheet does not include the base layer in a usage state. For example, when the gas barrier pressure-sensitive adhesive sheet includes a release sheet described later, the release sheet has been removed in a state in which the gas barrier pressure-sensitive adhesive sheet is bonded to the adherend (usage state). Therefore, the gas barrier pressure-sensitive adhesive sheet in which only the release sheet includes the base layer satisfies the requirement "the gas barrier pressure-sensitive adhesive sheet not including a base layer".

The tensile modulus at 23° C. may be measured by a known method.

The gas barrier pressure-sensitive adhesive sheet preferably has a substantial thickness of 0.5 to 50 μm, more preferably 1 to 40 μm, still more preferably 1 to 30 μm, and yet more preferably 1 to 10 μm, from the viewpoint of the handling capability of the gas barrier pressure-sensitive adhesive sheet.

The term "substantial thickness" used herein refers to the thickness of the gas barrier pressure-sensitive adhesive sheet in a usage state. Specifically, the gas barrier pressure-sensitive adhesive sheet according to one embodiment of the invention may include the release sheet and the like until the gas barrier pressure-sensitive adhesive sheet is bonded to the adherend (as described later), and the thickness of the part (e.g., release sheet) that is removed before the gas barrier pressure-sensitive adhesive sheet is bonded to the adherend is excluded from the substantial thickness.

The substantial thickness of the gas barrier pressure-sensitive adhesive sheet may be measured using a known measurement apparatus. For example, the substantial thickness of the gas barrier pressure-sensitive adhesive sheet may be measured using the apparatus described later in connection with the examples.

When the gas barrier pressure-sensitive adhesive sheet includes the release sheet, the thickness of the gas barrier pressure-sensitive adhesive sheet including the release sheet is measured, the thickness of the release sheet is measured after removing the release sheet, and the substantial thickness of the gas barrier pressure-sensitive adhesive sheet is calculated by subtracting the thickness of the release sheet from the thickness of the gas barrier pressure-sensitive adhesive sheet including the release sheet.

The gas barrier pressure-sensitive adhesive sheet according to one embodiment of the invention may include an additional layer (e.g., protective layer or conductive layer) in addition to the gas barrier layer and the pressure-sensitive adhesive layer. The additional layer remains in the gas barrier pressure-sensitive adhesive sheet (i.e., is included in the gas barrier pressure-sensitive adhesive sheet) in a usage state without being removed, and provides the gas barrier pressure-sensitive adhesive sheet with various functions. Therefore, the additional layer does not fall under the term "base layer".

Protective Layer

The gas barrier pressure-sensitive adhesive sheet according to one embodiment of the invention may include a protective layer. The protective layer is a layer that protects the gas barrier layer when an impact is applied to the gas barrier layer from the outside.

The protective layer may be situated at an arbitrary position. It is preferable that the protective layer be situated adjacent to the gas barrier layer.

It is preferable that the protective layer have high transparency and excellent scratch resistance. When the protective layer is situated on the outermost side when the gas barrier pressure-sensitive adhesive sheet is incorporated in an electronic device or an optical device, it is preferable that the protective layer have a stain-proof capability, a fingerprint-proof capability, an antistatic capability, water repellency, hydrophilicity, and the like.

The thickness of the protective layer may be appropriately selected taking account of the intended use of the gas barrier pressure-sensitive adhesive sheet and the like. The thickness of the protective layer is normally 0.05 to 10 μm, preferably 0.1 to 8.0 μm, more preferably 0.2 to 5.0 μm, and still more preferably 0.2 to 1.0 μm.

When the thickness of the protective layer is 0.05 μm or more, the protective layer exhibits sufficient scratch resistance. When the thickness of the protective layer is 10 μm or less, it is possible to suppress a situation in which the protective layer curls due to strain during curing.

The surface roughness Ra (arithmetic average roughness) of the protective layer is preferably 10.0 nm or less, and more preferably 8.0 nm or less. The surface roughness Rt (maximum roughness height) of the protective layer is preferably 100 nm or less, and more preferably 50 nm or less.

When the surface roughness Ra exceeds 10.0 nm, and/or the surface roughness Rt exceeds 100 nm, the surface roughness of the gas barrier layer and the pressure-sensitive adhesive layer may increase, and the gas barrier capability of the gas barrier pressure-sensitive adhesive sheet may deteriorate.

The surface roughness Ra and the surface roughness Rt refer to values measured by optical interferometry using a 100×100-μm sample.

A material for forming the protective layer is not particularly limited. The protective layer may be formed using a known material. Examples of the material for forming the protective layer include silicon-containing compounds; polymerizable compositions that include a photopolymerizable compound that includes a photopolymerizable monomer and/or a photopolymerizable prepolymer, and an initiator that generates radicals at least due to light in the visible region; resins such as a polyester resin, a polyurethane resin (particularly a two-component curable resin that includes an isocyanate compound and a polyacryl polyol, a polyester polyol, a polyether polyol, or the like), an acrylic resin, a polycarbonate resin, a vinyl chloride/vinyl acetate copolymer, a polyvinyl butyral resin, and a nitrocellulose resin; alkyl titanates; ethyleneimine; and the like.

These materials may be used either alone or in combination.

A polymerizable composition that includes a photopolymerizable compound that includes a photopolymerizable monomer and/or a photopolymerizable prepolymer, and an initiator that generates radicals at least due to light in the visible region, is preferable as the material for forming the protective layer since excellent transparency and scratch resistance can be achieved.

The active energy ray-curable compounds, the photoinitiators, and the like mentioned above in connection with the pressure-sensitive adhesive may be used as the photopolymerizable compound and the initiator.

The protective layer may be formed by dissolving or dispersing the above material in an appropriate solvent to prepare a protective layer-forming solution, applying the protective layer-forming solution by a known method to form a film, drying the film, and optionally applying heat or light to the dried film.

The protective layer-forming solution may be applied, and the film may be dried using the methods mentioned above in connection with the gas barrier layer.

Conductive Layer

The gas barrier pressure-sensitive adhesive sheet according to one embodiment of the invention may include a conductive layer. The conductive layer is a layer that exhibits electrical conductivity, and is used as an electrode, or used to improve the antistatic capability and the heat dissipation capability when the gas barrier pressure-sensitive adhesive sheet is included in an electronic member or the like.

The conductive layer may be situated at an arbitrary position depending on the intended use of the gas barrier pressure-sensitive adhesive sheet according to one embodiment of the invention.

The surface resistivity of the conductive layer is preferably 1000 Ω/square or less, and more preferably 200 Ω/square or less.

The thickness of the conductive layer may be appropriately selected taking account of the intended use of the gas barrier pressure-sensitive adhesive sheet and the like. The thickness of the conductive layer is normally 10 nm to 9 μm, and preferably 20 nm to 1.0 μm.

Examples of a material for forming the conductive layer include metals, alloys, metal oxides, electrically conductive compounds, mixtures thereof, and the like. Specific examples of the material for forming the conductive layer include antimony-doped tin oxide (ATO); fluorine-doped tin oxide (FTO); metal oxides such as tin oxide, zinc oxide, indium oxide, indium tin oxide (ITO), and indium zinc oxide (IZO); metals such as gold, silver, chromium, and nickel; mixtures thereof; inorganic conductive materials such as copper iodide and copper sulfide; organic conductive materials such as polyaniline, polythiophene, and polypyrrole; and the like.

Among these, metal oxides are preferable, and indium oxide-based metal oxides and zinc oxide-based metal oxides such as zinc oxide, indium oxide, indium tin oxide (ITO), and indium zinc oxide (IZO) are more preferable from the viewpoint of transparency.

The conductive layer may be formed by a deposition (evaporation) method, a sputtering method, an ion plating method, a thermal CVD method, a plasma CVD method, or the like. It is preferable to form the conductive layer by a sputtering method since the conductive layer can be easily formed.

The conductive layer may optionally be patterned. The conductive layer may be patterned by chemical etching (e.g., photolithography), physical etching using a laser or the like, a vacuum deposition method using a mask, a sputtering method, a lift-off method, a printing method, or the like.

Release Sheet

The gas barrier pressure-sensitive adhesive sheet according to one embodiment of the invention may include a release sheet. The release sheet is provided as the outermost layer of the gas barrier pressure-sensitive adhesive sheet. The release sheet protects the pressure-sensitive adhesive layer, the gas barrier layer, and the additional layer during storage, transportation, or the like of the gas barrier pressure-sensitive adhesive sheet, and supports the gas barrier pressure-sensitive adhesive sheet until immediately before the gas barrier pressure-sensitive adhesive sheet is used. The release sheet is removed before bonding the gas barrier pressure-sensitive adhesive sheet to the adherend.

The gas barrier pressure-sensitive adhesive sheet according to one embodiment of the invention may include the release sheet on one side thereof, or may include a first release sheet and a second release sheet on either side thereof. When the gas barrier pressure-sensitive adhesive sheet includes the first release sheet and the second release sheet on either side thereof, it is preferable that one of the first release sheet and the second release sheet that is to be removed before the other of the first release sheet and the second release sheet be designed to be more easily removed.

When implementing a method for producing a gas barrier pressure-sensitive adhesive sheet according to one embodiment of the invention (described later), the first release sheet and the second release sheet are used when forming the gas barrier layer and the pressure-sensitive adhesive layer.

The release sheet is prepared by applying a release agent to a release substrate (e.g., paper or plastic film) to form a release agent layer.

Examples of the release substrate include a paper substrate such as glassine paper, coated paper, and high-quality paper; laminated paper prepared by laminating a thermoplastic resin (e.g., polyethylene or polypropylene) on a paper substrate; a paper substrate that is sealed with cellulose, starch, polyvinyl alcohol, an acrylic styrene resin, or the like; a plastic film such as a polyester film (e.g., polyethylene terephthalate, polybutylene terephthalate, or polyethylene naphthalate) and a polyolefin film (e.g., polyethylene or polypropylene); and the like.

Examples of the release agent include release agents that include an olefin-based resin (e.g., polyethylene or polypropylene), a rubber-based elastomer (e.g., isoprene-based resin or butadiene-based resin), a long-chain alkyl-based resin, an alkyd-based resin, a fluorine-based resin, a silicone-based resin, or the like.

The thickness of the release agent layer is not particularly limited. When applying the release agent in a state of a solution, the thickness of the release agent layer is preferably 0.02 to 2.0 μm, and more preferably 0.05 to 1.5 μm.

The surface roughness Ra of the release sheet is preferably 10.0 nm or less, and more preferably 8.0 nm or less. The surface roughness Rt of the release sheet is preferably 100 nm or less, and more preferably 50 nm or less.

When the surface roughness Ra exceeds 10.0 nm, and/or the surface roughness Rt exceeds 100 nm, the surface roughness of the gas barrier layer or the pressure-sensitive adhesive layer that is formed on the release sheet may increase, and the gas barrier capability of the gas barrier pressure-sensitive adhesive sheet may deteriorate.

In particular, since the surface roughness of the release agent layer is easily transferred to the gas barrier layer or the pressure-sensitive adhesive layer when forming the gas barrier layer or the pressure-sensitive adhesive layer on the release sheet when producing the gas barrier pressure-sensitive adhesive sheet, it is preferable that the surface roughness Ra and the surface roughness Rt of the release sheet be within the above ranges.

The surface roughness measurement conditions are the same as those mentioned above in connection with the protective layer.

The gas barrier pressure-sensitive adhesive sheet according to one embodiment of the invention is not particularly limited as to the order and the number of layers as long as the above conditions are satisfied. For example, the pressure-sensitive adhesive layer may be provided on one side of the gas barrier layer (see (a) in FIG. 1), or the pressure-sensitive adhesive layer may be provided on each side of the gas barrier layer (see (b) in FIG. 1), or the protective layer may be provided on one side of the gas barrier layer (see (c) in FIG. 1). The gas barrier pressure-sensitive adhesive sheet may include two or more gas barrier layers and/or two or more protective layers (see (d) in FIG. 1).

It is preferable that the gas barrier pressure-sensitive adhesive sheet include two or more protective layers since an excellent gas barrier capability is obtained.

A gas barrier pressure-sensitive adhesive sheet 5A illustrated in FIG. 1 (see (a)) includes a gas barrier layer 1, a pressure-sensitive adhesive layer 2 that is positioned adjacent to the gas barrier layer 1, a release sheet 3a that is positioned adjacent to the outer surface of the pressure-sensitive adhesive layer 2, and a release sheet 3b that is positioned adjacent to the outer surface of the gas barrier layer 1.

A gas barrier pressure-sensitive adhesive sheet 5B illustrated in FIG. 1 (see (b)) includes a laminate in which a pressure-sensitive adhesive layer 2a, a gas barrier layer 1, and a pressure-sensitive adhesive layer 2b are sequentially stacked, a release sheet 3a that is positioned adjacent to the outer surface of the pressure-sensitive adhesive layer 2a, and a release sheet 3b that is positioned adjacent to the outer surface of the pressure-sensitive adhesive layer 2b.

A gas barrier pressure-sensitive adhesive sheet 5C illustrated in FIG. 1 (see (c)) includes a laminate in which a pressure-sensitive adhesive layer 2a, a gas barrier layer 1, and a protective layer 4 are sequentially stacked, a release sheet 3a that is positioned adjacent to the outer surface of the pressure-sensitive adhesive layer 2a, and a release sheet 3b that is positioned adjacent to the outer surface of the protective layer 4.

A gas barrier pressure-sensitive adhesive sheet 5D illustrated in FIG. 1 (see (d)) includes a laminate in which a pressure-sensitive adhesive layer 2a, a protective layer 4a, a gas barrier layer 1a, a pressure-sensitive adhesive layer 2b, a protective layer 4b, a gas barrier layer 1b, and a pressure-sensitive adhesive layer 2c are sequentially stacked, a release sheet 3a that is positioned adjacent to the outer surface of the pressure-sensitive adhesive layer 2a, and a release sheet 3b that is positioned adjacent to the outer surface of the pressure-sensitive adhesive layer 2c.

The gas barrier pressure-sensitive adhesive sheet may have a layer configuration "conductive layer/gas barrier layer/pressure-sensitive adhesive layer", "conductive layer/protective layer/gas barrier layer/pressure-sensitive adhesive layer", "pressure-sensitive adhesive layer/protective layer/gas barrier layer/pressure-sensitive adhesive layer", "pressure-sensitive adhesive layer/gas barrier layer/pressure-sensitive adhesive layer/gas barrier layer/pressure-sensitive adhesive layer", "protective layer/gas barrier layer/pressure-sensitive adhesive layer/gas barrier layer/pressure-sensitive adhesive layer", "protective layer/gas barrier layer/pressure-sensitive adhesive layer/protective layer/gas barrier layer/pressure-sensitive adhesive layer", or the like.

Note that the above layer configurations indicate the configuration in a usage state (e.g., the configuration excluding the release sheet).

The gas barrier pressure-sensitive adhesive sheet according to one embodiment of the invention exhibits an excellent gas barrier capability since the gas barrier pressure-sensitive adhesive sheet has a low water vapor transmission rate.

The water vapor transmission rate of the gas barrier pressure-sensitive adhesive sheet at a temperature of 40° C. and a relative humidity of 90% is normally 1.0 g/m$^2$/day or less, preferably 0.8 g/m$^2$/day or less, more preferably 0.5 g/m$^2$/day or less, and still more preferably 0.1 g/m$^2$/day or less. The water vapor transmission rate may be measured using a known gas transmission rate measurement apparatus.

Since the gas barrier pressure-sensitive adhesive sheet according to one embodiment of the invention exhibits excellent bendability, heat resistance, and humidity resistance, delamination (separation) rarely occurs at the interface between the pressure-sensitive adhesive layer and another layer, and blisters or lifting rarely occur even when the gas barrier pressure-sensitive adhesive sheet is bent, or exposed to a high temperature/high humidity for a long time.

Since the gas barrier pressure-sensitive adhesive sheet according to one embodiment of the invention has a reduced weight, and exhibits an excellent gas barrier capability, it is possible to provide the adherend with a gas barrier capability and the like without impairing the external appearance of the adherend by bonding the gas barrier pressure-sensitive adhesive sheet to an electronic member, an optical member, a food/drink packaging material, a drug packaging material, or the like (i.e., adherend) through the pressure-sensitive adhesive layer. Therefore, the gas barrier pressure-sensitive adhesive sheet according to one embodiment of the invention may be used as a gas barrier pressure-sensitive adhesive sheet for an electronic member, an optical member, a food/drink packaging material, and a drug packaging material. The gas barrier pressure-sensitive adhesive sheet according to one embodiment of the invention may preferably be used as a gas barrier pressure-sensitive adhesive sheet for an electronic member or an optical member. In particular, the gas barrier pressure-sensitive adhesive sheet according to one embodiment of the invention may preferably be used as a gas barrier pressure-sensitive adhesive sheet for an electronic member (e.g., flexible display substrate) for which flexibility is required, or an optical member (e.g., liquid crystal display plastic substrate) for which heat resistance and humidity resistance are required.

2) Method for Producing Gas Barrier Pressure-Sensitive Adhesive Sheet

The gas barrier pressure-sensitive adhesive sheet according to one embodiment of the invention may be produced by an arbitrary method. The gas barrier pressure-sensitive adhesive sheet according to one embodiment of the invention may be produced using a known method. It is preferable to produce the gas barrier pressure-sensitive adhesive sheet according to one embodiment of the invention using a release sheet since the gas barrier pressure-sensitive adhesive sheet can be efficiently and easily produced.

A method for producing a gas barrier pressure-sensitive adhesive sheet according to one embodiment of the invention includes forming a pressure-sensitive adhesive layer or a gas barrier layer on a release side of a release sheet.

It is preferable that the method for producing a gas barrier pressure-sensitive adhesive sheet according to one embodiment of the invention include a step 1 that forms a gas barrier layer on a release side of a first release sheet to obtain a release sheet provided with the gas barrier layer, a step 2 that forms a pressure-sensitive adhesive layer on a release side of a second release sheet to obtain a release sheet provided with the pressure-sensitive adhesive layer, and a step 3 that bonds the release sheet provided with the gas barrier layer and the release sheet provided with the pressure-sensitive adhesive layer so that the gas barrier layer and the pressure-sensitive adhesive layer face each other.

For example, the gas barrier pressure-sensitive adhesive sheet 5A illustrated in FIG. 1 (see (a)) may be obtained by the following steps A1 to A3.

Step A1: Step that forms a gas barrier layer on a release side of a first release sheet to obtain a release sheet provided with the gas barrier layer (step 1)

Step A2: Step that forms a pressure-sensitive adhesive layer on a release side of a second release sheet to obtain a release sheet provided with the pressure-sensitive adhesive layer (step 2)

Step A3: Step that bonds the pressure-sensitive adhesive layer of the release sheet provided with the pressure-sensitive adhesive layer to the gas barrier layer of the release sheet provided with the gas barrier layer (step 3)

The gas barrier pressure-sensitive adhesive sheet 5B illustrated in FIG. 1 (see (b)) may be obtained by the following steps B1 and B2.

Step B1: Step that forms a pressure-sensitive adhesive layer on a release side of a release sheet to obtain a release sheet provided with the pressure-sensitive adhesive layer (step 2)

Step B2: Step that removes the release sheet from the gas barrier layer of the gas barrier pressure-sensitive adhesive sheet obtained by the steps A1 to A3, and bonds the pressure-sensitive adhesive layer of the release sheet provided with the pressure-sensitive adhesive layer obtained by the step B1 to the exposed gas barrier layer (step 1 and step 3)

The gas barrier pressure-sensitive adhesive sheet 5C illustrated in FIG. 1 (see (c)) may be obtained by the following steps C1 to C4.

Step C1: Step that forms a protective layer on a release side of a first release sheet to obtain a release sheet provided with the protective layer Step C2: Step that forms a gas barrier layer on the protective layer of the release sheet provided with the protective layer obtained by the step C1 (step 1)

Step C3: Step that forms the pressure-sensitive adhesive layer 2a on a release side of a second release sheet to obtain a release sheet provided with the pressure-sensitive adhesive layer (step 2)

Step C4: Step that bonds the pressure-sensitive adhesive layer formed by the step C3 to the gas barrier layer formed by the step C2 (step 3)

The gas barrier pressure-sensitive adhesive sheet 5D illustrated in FIG. 1 (see (d)) may be obtained by the following steps D1 to D3.

Step D1: Step that forms a pressure-sensitive adhesive layer on a release side of a first release sheet to obtain a release sheet provided with the pressure-sensitive adhesive layer (step 2)

Step D2: Step that forms first and second gas barrier pressure-sensitive adhesive sheets by performing the steps C1 to C4, removes the release sheet from the pressure-sensitive adhesive layer of the first gas barrier pressure-sensitive adhesive sheet, removes the release sheet from the protective layer of the second gas barrier pressure-sensitive adhesive sheet, and bonds the pressure-sensitive adhesive layer of the first gas barrier pressure-sensitive adhesive sheet to the protective layer of the second gas barrier pressure-sensitive adhesive sheet to obtain a laminate having a layer configuration "release sheet/protective layer/gas barrier layer/pressure-sensitive adhesive layer/protective layer/gas barrier layer/pressure-sensitive adhesive layer/release sheet" (step 1 and step 3)

Step D3: Step that removes the release sheet from the protective layer of the laminate obtained by the step D2, and bonds the pressure-sensitive adhesive layer of the release sheet provided with the pressure-sensitive adhesive layer obtained by the step D1 to the exposed protective layer The gas barrier pressure-sensitive adhesive sheet according to one embodiment of the invention can be efficiently produced by utilizing the method for producing a gas barrier pressure-sensitive adhesive sheet according to one embodiment of the invention.

3) Electronic Member or Optical Member that Includes Gas Barrier Pressure-Sensitive Adhesive Sheet An electronic member or an optical member according to one embodiment of the invention includes the gas barrier pressure-sensitive adhesive sheet according to one embodiment of the invention.

Examples of the electronic member include flexible substrates such as a liquid crystal display member, an organic EL display member, an inorganic EL display member, an electronic paper member, a solar cell member, and a thermoelectric conversion member.

Examples of the optical member include optical members of an optical filter, a wavelength conversion device, a dimming device, a polarizer, a retardation film, and the like.

Since the electronic member or the optical member according to one embodiment of the invention includes the gas barrier pressure-sensitive adhesive sheet according to one embodiment of the invention that is stacked through the pressure-sensitive adhesive layer, the electronic member or the optical member exhibits an excellent gas barrier capability, and can prevent entrance of gas (e.g., water vapor).

Moreover, the electronic member or the optical member according to one embodiment of the invention has a reduced weight and thickness, exhibits high durability, and rarely shows removal of the gas barrier pressure-sensitive adhesive sheet and a deterioration in gas barrier capability even when the electronic member or the optical member is rolled (curved) or bent, or used under high-temperature conditions or high-humidity conditions.

EXAMPLES

The invention is further described below by way of examples. Note that the invention is not limited to the following examples.

Preparation of Pressure-Sensitive Adhesive Layer-Forming Solution

Pressure-sensitive adhesive layer-forming solutions A to H were prepared as described below.

The following pressure-sensitive adhesive, crosslinking agent, silane coupling agent, and photoinitiator were used to prepare the pressure-sensitive adhesive layer-forming solution.

(1) Pressure-Sensitive Adhesive

Acrylic-Based Copolymer A

Acrylate-based copolymer obtained by polymerizing n-butyl acrylate and acrylic acid in a mass ratio (n-butyl acrylate: acrylic acid) of 95:5 (mass average molecular weight: about 1,200,000)

Acrylic-Based Copolymer B

Acrylate-based copolymer obtained by polymerizing n-butyl acrylate and acrylic acid in a mass ratio (n-butyl acrylate: acrylic acid) of 95:5 (mass average molecular weight: about 1,500,000)

Acrylic-Based Copolymer C

Acrylate-based copolymer obtained by polymerizing n-butyl acrylate and acrylic acid in a mass ratio (n-butyl acrylate: acrylic acid) of 99:1 (mass average molecular weight: about 50,000)

Acrylic-Based Copolymer D

Acrylate-based copolymer obtained by polymerizing n-butyl acrylate and 2-hydroxyethyl acrylate in a mass ratio (n-butyl acrylate:2-hydroxyethyl acrylate) of 99.9:0.1 (mass average molecular weight: about 200,000)

Rubber-Based Pressure-Sensitive Adhesive
"TN-286" manufactured by Matsumura Oil Co., Ltd.
Silicone-Based Pressure-Sensitive Adhesive
"SD-4580" manufactured by Dow Corning Toray Co., Ltd.

(2) Crosslinking Agent

Crosslinking agent A: trimethylolpropanetolylene diisocyanate ("Coronate L" manufactured by Nippon Polyurethane Industry Co., Ltd.)

(3) Silane Coupling Agent

Silane coupling agent A: "KBM403" manufactured by Shin-Etsu Chemical Co., Ltd.

(4) Photoinitiator

Photoinitiator A: "Irgacure 127" manufactured by Ciba Specialty Chemicals Co., Ltd.

Photoinitiator B: "Irgacure 500" manufactured by Ciba Specialty Chemicals Co., Ltd.

(5) Energy Ray-Curable Resin

Energy ray-curable resin A: "M315" manufactured by Toagosei Co., Ltd.

Energy ray-curable resin B: "DPHA" manufactured by Nippon Kayaku Co., Ltd.

(1) Preparation of Pressure-Sensitive Adhesive Layer-Forming Solution A 100 parts by mass of an ethyl acetate solution (solid content: 18%) of the acrylic-based copolymer A, 0.1 parts by mass (on a solid basis) of the crosslinking agent A, and 0.1 parts by mass of the silane coupling agent A were mixed to prepare the pressure-sensitive adhesive layer-forming solution A. A pressure-sensitive adhesive layer obtained using the pressure-sensitive adhesive layer-forming solution A is referred to as "pressure-sensitive adhesive layer A".

(2) Preparation of Pressure-Sensitive Adhesive Layer-Forming Solution B 100 parts by mass of the rubber-based pressure-sensitive adhesive, 30 parts by mass of 1,6-hexanediol diacrylate (active energy ray-curable compound), 1.5 parts by mass of the photoinitiator A, and 0.1 parts by mass of the silane coupling agent A were mixed to prepare the pressure-sensitive adhesive layer-forming solution B. A pressure-sensitive adhesive layer obtained using the pressure-sensitive adhesive layer-forming solution B is referred to as "pressure-sensitive adhesive layer B".

(3) Preparation of Pressure-Sensitive Adhesive Layer-Forming Solution C 100 parts by mass of the silicone-based pressure-sensitive adhesive and 0.9 parts by mass of a platinum catalyst ("SRX-212" manufactured by Dow Corning Toray Co., Ltd.) were mixed to prepare the pressure-sensitive adhesive layer-forming solution C. A pressure-sensitive adhesive layer obtained using the pressure-sensitive adhesive layer-forming solution C is referred to as "pressure-sensitive adhesive layer C".

(4) Preparation of Pressure-Sensitive Adhesive Layer-Forming Solution D 100 parts by mass of an ethyl acetate solution (solid content: 18%) of the acrylic-based copolymer B, 2 parts by mass (on a solid basis) of the crosslinking agent A, 15 parts by mass of the energy ray-curable resin A, 2 parts by mass (based on 100 parts by mass (on a solid basis) of the energy ray-curable resin A) of the photoinitiator B, and 0.1 parts by mass (based on 100 parts by mass (on a solid basis) of the acrylic-based pressure-sensitive adhesive) of the silane coupling agent A were mixed to prepare the pressure-sensitive adhesive layer-forming solution D. A pressure-sensitive adhesive layer obtained using the pressure-sensitive adhesive layer-forming solution D is referred to as "pressure-sensitive adhesive layer D".

(5) Preparation of Pressure-Sensitive Adhesive Layer-Forming Solution E 100 parts by mass of an ethyl acetate solution (solid content: 18%) of the acrylic-based copolymer B, 2 parts by mass (on a solid basis) of the crosslinking agent A, 35 parts by mass of the energy ray-curable resin A, 2 parts by mass (based on 100 parts by mass (on a solid basis) of the energy ray-curable resin A) of the photoinitiator B, and 0.1 parts by mass (based on 100 parts by mass (on a solid basis) of the acrylic-based pressure-sensitive adhesive) of the silane coupling agent A were mixed to prepare the pressure-sensitive adhesive layer-forming solution E. A pressure-sensitive adhesive layer obtained using the pressure-sensitive adhesive layer-forming solution E is referred to as "pressure-sensitive adhesive layer E".

(6) Preparation of Pressure-Sensitive Adhesive Layer-Forming Solution F 100 parts by mass of an ethyl acetate solution (solid content: 18%) of the acrylic-based copolymer B, 15 parts by mass of the acrylic-based copolymer C, 0.5 parts by mass (on a solid basis) of the crosslinking agent A, and 0.1 parts by mass of the silane coupling agent A were mixed to prepare the pressure-sensitive adhesive layer-forming solution F. A pressure-sensitive adhesive layer obtained using the pressure-sensitive adhesive layer-forming solution F is referred to as "pressure-sensitive adhesive layer F".

(7) Preparation of Pressure-Sensitive Adhesive Layer-Forming Solution G 100 parts by mass of an ethyl acetate solution (solid content: 40%) of the acrylic-based copolymer D and 0.01 parts by mass (on a solid basis) of the crosslinking agent A were mixed to prepare the pressure-sensitive adhesive layer-forming solution G. A pressure-sensitive adhesive layer obtained using the pressure-sensitive adhesive layer-forming solution G is referred to as "pressure-sensitive adhesive layer G".

(8) Preparation of Pressure-Sensitive Adhesive Layer-Forming Solution H 100 parts by mass of an ethyl acetate solution (solid content: 18%) of the acrylic-based copolymer B, 2 parts by mass (on a solid basis) of the crosslinking agent A, 30 parts by mass of the energy ray-curable resin A, 20 parts by mass of the energy ray-curable resin B, 2 parts by mass (based on 100 parts by mass (on a solid basis) of the energy ray-curable resin A and the energy ray-curable resin B in total) of the photoinitiator B, and 0.1 parts by mass (based on 100 parts by mass (on a solid basis) of the acrylic-based copolymer B) of the silane coupling agent A were mixed to prepare the pressure-sensitive adhesive layer-forming solution H. A pressure-sensitive adhesive layer obtained using the pressure-sensitive adhesive layer-forming solution H is referred to as "pressure-sensitive adhesive layer H".

Release Sheet

The following release sheets were used.
Release sheet A: "SP-PET381031" manufactured by Lintec Corporation) (a release sheet in which a silicone release layer is provided on one side of a polyethylene terephthalate film having a thickness of 38 μm)
Release sheet B: "SP-PFS50AL-5" manufactured by Lintec Corporation) (a release sheet in which a release layer is provided on one side of a polyethylene terephthalate film having a thickness of 50 μm)

Measurement of Storage Modulus

Each of the pressure-sensitive adhesive layer-forming solutions A to H was applied to the release layer of the release sheet A so that the thickness after drying was 25 μm, and dried to form a pressure-sensitive adhesive layer to obtain a release sheet provided with the pressure-sensitive adhesive layer.

When using the pressure-sensitive adhesive layer-forming solution D, E, or H, the dry film of the pressure-sensitive adhesive layer-forming solution D, E, or H was irradiated with UV rays at an intensity of 200 mW/cm$^2$ and a dose of 300 mJ/cm$^2$ using a high-pressure mercury lamp (manufactured by Eye Graphics Co., Ltd.) to form the pressure-sensitive adhesive layer D, E, or H.

The pressure-sensitive adhesive layer of another release sheet provided with an identical type of pressure-sensitive adhesive layer was stacked on the pressure-sensitive adhesive layer of the release sheet provided with the pressure-sensitive adhesive layer obtained as described above.

The pressure-sensitive adhesive layer of still another release sheet provided with an identical type of pressure-sensitive adhesive layer was stacked on the pressure-sensitive adhesive layer that had been exposed by removing the release sheet A. The above operation was repeated until the total thickness of the pressure-sensitive adhesive layers (laminate) was 3 mm. The laminate was stamped out in the shape of a column having a diameter of 8 mm to prepare samples of the pressure-sensitive adhesive layers A to H.

The storage modulus of the samples of the pressure-sensitive adhesive layers A to H was measured by a torsional shear method in accordance with JIS K 7244-6 under the following measurement conditions. The measurement results are shown in Table 1.

Measurement Conditions
Viscoelastometer: "DYNAMIC ANALYZER RDA II" manufactured by TA Instruments Japan Inc.
Frequency: 1 Hz
Temperature: 23° C. or 80° C.

TABLE 1

| Pressure-sensitive | Storage modulus (Pa) | |
|---|---|---|
| adhesive layer | 23° C. | 80° C. |
| A | $2.3 \times 10^5$ | $1.2 \times 10^5$ |
| B | $2.0 \times 10^4$ | $1.0 \times 10^4$ |
| C | $8.0 \times 10^4$ | $2.3 \times 10^4$ |
| D | $6.6 \times 10^5$ | $5.3 \times 10^5$ |
| E | $8.0 \times 10^6$ | $1.0 \times 10^6$ |
| F | $5.0 \times 10^4$ | $7.8 \times 10^3$ |
| G | $1.0 \times 10^4$ | $6.8 \times 10^3$ |
| H | $2.5 \times 10^7$ | $1.0 \times 10^7$ |

Example 1

A silicon nitride gas barrier layer (gas barrier layer A) having a thickness of 60 nm was formed on the release layer of the release sheet B using a sputtering method to obtain the release sheet B provided with the gas barrier layer A.

The pressure-sensitive adhesive layer-forming solution A was applied to the release layer of the release sheet A using a gravure coating method, and dried at 110° C. for 1 minute to form a pressure-sensitive adhesive layer A having a thickness of about 1 μm to obtain the release sheet A provided with the pressure-sensitive adhesive layer A.

The pressure-sensitive adhesive layer A of the release sheet A provided with the pressure-sensitive adhesive layer A was bonded to the gas barrier layer A of the release sheet B provided with the gas barrier layer A to obtain a gas barrier pressure-sensitive adhesive sheet having a layer configuration "release sheet A/pressure-sensitive adhesive layer A/gas barrier layer A/release sheet B".

Examples 2 to 6 and Comparative Examples 1 and 2

A gas barrier pressure-sensitive adhesive sheet having a layer configuration "release sheet A/pressure-sensitive adhesive layer (B to H)/gas barrier layer A/release sheet B" was obtained in the same manner as in Example 1, except that the corresponding pressure-sensitive adhesive layer-forming solution among the pressure-sensitive adhesive layer-forming solutions B to H was used as the pressure-sensitive adhesive layer-forming solution for forming the pressure-sensitive adhesive layer.

In Examples 4 and 5 in which the pressure-sensitive adhesive layer-forming solutions D and E were respectively used, and Comparative Example 2 in which the pressure-sensitive adhesive layer-forming solution H was used, UV rays were applied through the release sheet positioned adjacent to the pressure-sensitive adhesive layer at an intensity of 200 mW/cm$^2$ and a dose of 300 mJ/cm$^2$ using a high-pressure mercury lamp (manufactured by Eye Graphics Co., Ltd.) when 30 seconds had elapsed after bonding to obtain the gas barrier pressure-sensitive adhesive sheet.

The intensity and the dose were measured using a UV meter ("UVPF-36" manufactured by Eye Graphics Co., Ltd.).

Example 7

The pressure-sensitive adhesive layer-forming solution A was applied to the release layer of the release sheet A using a gravure coating method, and dried at 110° C. for 1 minute to form a pressure-sensitive adhesive layer A having a thickness of about 1 μm to obtain the release sheet A provided with the pressure-sensitive adhesive layer A.

The release sheet B was removed from the gas barrier layer A of the gas barrier pressure-sensitive adhesive sheet obtained in Example 1, and the pressure-sensitive adhesive layer A of the release sheet A provided with the pressure-sensitive adhesive layer A was bonded to the exposed gas barrier layer A to obtain a gas barrier pressure-sensitive adhesive sheet having a layer configuration "release sheet A/pressure-sensitive adhesive layer A/gas barrier layer A/pressure-sensitive adhesive layer A/release sheet A".

Examples 8 to 12

A gas barrier pressure-sensitive adhesive sheet having a layer configuration "release sheet A/pressure-sensitive adhesive layer/gas barrier layer A/pressure-sensitive adhesive layer/release sheet B" (see Table 2) was obtained in the same manner as in Example 7, except that the pressure-sensitive adhesive layer-forming solution for forming the pressure-sensitive adhesive layer of the release sheet A and the pressure-sensitive adhesive layer of the release sheet B was changed. In Table 2, the release sheets A and B are merely referred to as "release sheet".

When using the pressure-sensitive adhesive layer-forming solution D or E, UV rays were applied through the release sheet at an intensity of 200 mW/cm$^2$ and a dose of 300 mJ/cm$^2$ using a high-pressure mercury lamp (manufactured by Eye Graphics Co., Ltd.) to obtain the gas barrier pressure-sensitive adhesive sheet.

Example 13

The photoinitiator A was added to a methyl isobutyl ketone solution of energy ray-curable resins (100 parts by mass of a UV-curable polyfunctional acrylate ("KAYARAD DPHA" manufactured by Nippon Kayaku Co., Ltd.), 100 parts by mass of a UV-curable polyfunctional acrylate ("KAYARAD DCPA" manufactured by Nippon Kayaku Co., Ltd.), and 80 parts by mass of a bifunctional urethane acrylate ("UT-4692" manufactured by Nippon Synthetic Chemical Industry Co., Ltd.)) so that the content of the photoinitiator A was 3 mass % based on the energy ray-curable resins. The mixture was diluted with methyl isobutyl ketone so that the solid content was 15% to prepare a protective layer-forming solution.

The protective layer-forming solution was applied to the release layer of the release sheet B using a gravure coating method, dried at 70° C. for 1 minute, and irradiated with UV rays at an intensity of 200 mW/cm$^2$ and a dose of 300 mJ/cm$^2$ using a UV irradiation apparatus ("ECX-401GX" manufactured by Eye Graphics Co., Ltd.) in an atmosphere having an oxygen concentration of 1% or less to form a protective layer having a thickness of 1 μm.

A silicon nitride gas barrier layer A having a thickness of 60 nm was formed on the protective layer using a sputtering method.

The pressure-sensitive adhesive layer-forming solution A was applied to the release layer of the release sheet A using a gravure coating method, and dried at 110° C. for 1 minute to form a pressure-sensitive adhesive layer A having a thickness of about 1 μm.

The pressure-sensitive adhesive layer A was bonded to the gas barrier layer A to obtain a gas barrier pressure-sensitive adhesive sheet having a layer configuration "release sheet A/pressure-sensitive adhesive layer A/gas barrier layer A/protective layer/release sheet B".

Example 14

A gas barrier pressure-sensitive adhesive sheet having a layer configuration "release sheet A/pressure-sensitive adhesive layer D/gas barrier layer A/protective layer/release sheet B" was obtained in the same manner as in Example 13, except that the pressure-sensitive adhesive layer-forming solution D was used instead of the pressure-sensitive adhesive layer forming solution A, and UV rays were applied through the release sheet at an intensity of 200 mW/cm$^2$ and a dose of 300 mJ/cm$^2$ to form a pressure-sensitive adhesive layer D.

Example 15

A gas barrier pressure-sensitive adhesive sheet having a layer configuration "release sheet A/pressure-sensitive adhesive layer F/gas barrier layer A/protective layer/release sheet B" was obtained in the same manner as in Example 14, except that the pressure-sensitive adhesive layer-forming solution F was used instead of the pressure-sensitive adhesive layer forming solution D.

Example 16

The pressure-sensitive adhesive layer-forming solution A was applied to the release layer of the release sheet A using a gravure coating method, and dried at 110° C. for 1 minute to form a pressure-sensitive adhesive layer A having a thickness of about 1 μm to obtain the release sheet A provided with the pressure-sensitive adhesive layer A.

The release sheet A was removed from the pressure-sensitive adhesive layer A of the gas barrier pressure-sensitive adhesive sheet obtained in Example 13, and the release sheet B was removed from the protective layer of the gas barrier pressure-sensitive adhesive sheet obtained in Example 14. The exposed pressure-sensitive adhesive layer A was bonded to the protective layer to obtain a laminate having a layer configuration "release sheet B/protective layer/gas barrier layer A/pressure-sensitive adhesive layer A/protective layer/gas barrier layer A/pressure-sensitive adhesive layer D/release sheet A".

The release sheet B was removed from the protective layer of the laminate, and the pressure-sensitive adhesive layer A of the release sheet A provided with the pressure-sensitive adhesive layer A was bonded to the protective layer to obtain a gas barrier pressure-sensitive adhesive sheet having a layer configuration "release sheet A/pressure-sensitive adhesive layer A/protective layer/gas barrier layer A/pressure-sensitive adhesive layer A/protective layer/gas barrier layer A/pressure-sensitive adhesive layer D/release sheet B".

Example 17

A gas barrier pressure-sensitive adhesive sheet having a layer configuration "release sheet A/pressure-sensitive adhesive layer A/protective layer/gas barrier layer A/pressure-sensitive adhesive layer A/protective layer/gas barrier layer A/pressure-sensitive adhesive layer F/release sheet B" was obtained in the same manner as in Example 16, except that the gas barrier pressure-sensitive adhesive sheet obtained in Example 15 was used instead of the gas barrier pressure-sensitive adhesive sheet obtained in Example 14.

Example 18

A polysilazane compound (a coating material including perhydropolysilazane as the main component ("Aquamika NL110-20" manufactured by Clariant Japan K.K.)) was spin-coated onto the release layer of the release sheet B, and heated at 120° C. for 1 minute to form a layer (polysilazane layer) including perhydropolysilazane and having a thickness of 60 nm.

Ions derived from argon gas (Ar) were implanted into the surface of the polysilazane layer using a plasma ion implantation apparatus (RF power supply: "RF" 56000 manufactured by JEOL Ltd; high-voltage pulse power supply: "PV-3-HSHV-0835" manufactured by Kurita Seisakusho Co., Ltd.) (gas flow rate 100 sccm, duty ratio: 0.5%, applied voltage: −6 kV, frequency: 13.56 MHz, applied power: 1000 W, chamber internal pressure: 0.2 Pa, pulse width: 5 μs, implantation time: 200 seconds) to form a gas barrier layer (gas barrier layer B) to obtain a release sheet B2 provided with the gas barrier layer B.

The pressure-sensitive adhesive layer A of the release sheet A provided with the pressure-sensitive adhesive layer A was bonded to the gas barrier layer B of the release sheet B2 provided with the gas barrier layer B to obtain a gas barrier pressure-sensitive adhesive sheet having a layer configuration "release sheet A/pressure-sensitive adhesive layer A/gas barrier layer B/release sheet B".

Example 19

The pressure-sensitive adhesive layer D of the release sheet A provided with the pressure-sensitive adhesive layer D was bonded to the gas barrier layer B of the release sheet B2 provided with the gas barrier layer B obtained in Example 18 to obtain a gas barrier pressure-sensitive adhesive sheet having a layer configuration "release sheet A/pressure-sensitive adhesive layer D/gas barrier layer B/release sheet B".

Table 2 shows the substantial thickness of the gas barrier pressure-sensitive adhesive sheets of Examples 1 to 19 and Comparative Examples 1 and 2.

The substantial thickness (m) of the gas barrier pressure-sensitive adhesive sheet was calculated by the following expression using the thickness (A) of the gas barrier pressure-sensitive adhesive sheets of Examples 1 to 17 and Comparative Example 1 measured using a digital micrometer ("DIGIMICRO MH-15M" manufactured by Nikon Corporation) in a state in which the release sheet was bonded, and the thickness (B) of the release sheet measured in a state in which the release sheet had been removed.

Substantial thickness of gas barrier pressure-sensitive adhesive sheet=$(A)-(B)$ Table 2 shows the layer configuration (configuration) and the substantial thickness (thickness (μm)) of the gas barrier pressure-sensitive adhesive sheets of Examples 1 to 19 and Comparative Examples 1 and 2.

TABLE 2

| | Configuration | Thickness (μm) |
|---|---|---|
| Example 1 | Release sheet/pressure-sensitive adhesive layer A/gas barrier layer A/release sheet | 1.1 |
| Example 2 | Release sheet/pressure-sensitive adhesive layer B/gas barrier layer A/release sheet | 1.1 |
| Example 3 | Release sheet/pressure-sensitive adhesive layer C/gas barrier layer A/release sheet | 1.1 |
| Example 4 | Release sheet/pressure-sensitive adhesive layer D/gas barrier layer A/release sheet | 1.1 |
| Example 5 | Release sheet/pressure-sensitive adhesive layer E/gas barrier layer A/release sheet | 1.1 |
| Example 6 | Release sheet/pressure-sensitive adhesive layer F/gas barrier layer A/release sheet | 1.1 |
| Example 7 | Release sheet/pressure-sensitive adhesive layer A/gas barrier layer A/pressure-sensitive adhesive layer A/release sheet | 2.1 |
| Example 8 | Release sheet/pressure-sensitive adhesive layer A/gas barrier layer A/pressure-sensitive adhesive layer D/release sheet | 2.1 |
| Example 9 | Release sheet/pressure-sensitive adhesive layer D/gas barrier layer A/pressure-sensitive adhesive layer D/release sheet | 2.1 |
| Example 10 | Release sheet/pressure-sensitive adhesive layer A/gas barrier layer A/pressure-sensitive adhesive layer F/release sheet | 2.1 |
| Example 11 | Release sheet/pressure-sensitive adhesive layer F/gas barrier layer A/pressure-sensitive adhesive layer F/release sheet | 2.1 |
| Example 12 | Release sheet/pressure-sensitive adhesive layer D/gas barrier layer A/pressure-sensitive adhesive layer F/release sheet | 2.1 |
| Example 13 | Release sheet/pressure-sensitive adhesive layer A/gas barrier layer A/protective layer/release sheet | 2.1 |
| Example 14 | Release sheet/pressure-sensitive adhesive layer D/gas barrier layer A/protective layer/release sheet | 2.1 |
| Example 15 | Release sheet/pressure-sensitive adhesive layer F/gas barrier layer A/protective layer/release sheet | 2.0 |
| Example 16 | Release sheet/pressure-sensitive adhesive layer A/protective layer/gas barrier layer A/pressure-sensitive adhesive layer A/protective layer/gas barrier layer A/pressure-sensitive adhesive layer D/release sheet | 5.1 |
| Example 17 | Release sheet/pressure-sensitive adhesive layer A/protective layer/gas barrier layer A/pressure-sensitive adhesive layer A/protective layer/gas barrier layer A/pressure-sensitive adhesive layer F/release sheet | 5.2 |
| Example 18 | Release sheet/pressure-sensitive adhesive layer A/gas barrier layer B/release sheet | 1.1 |
| Example 19 | Release sheet/pressure-sensitive adhesive layer D/gas barrier layer B/release sheet | 1.1 |

TABLE 2-continued

| | Configuration | Thickness (μm) |
|---|---|---|
| Comparative Example 1 | Release sheet/pressure-sensitive adhesive layer G/gas barrier layer A/release sheet | 1.1 |
| Comparative Example 2 | Release sheet/pressure-sensitive adhesive layer H/gas barrier layer A/release sheet | 1.1 |

Evaluation of Gas Barrier Pressure-Sensitive Adhesive Sheet

The release sheet was removed from the pressure-sensitive adhesive layer of the gas barrier pressure-sensitive adhesive sheets obtained in Examples 1 to 6, 13 to 15, 18, and 19, and Comparative Examples 1 and 2. After bonding a polyethylene terephthalate film (hereinafter referred to as "PET film") having a thickness of 50 μm (adherend) to the exposed pressure-sensitive adhesive layer, the release sheet was removed from the opposite side of the gas barrier pressure-sensitive adhesive sheets. When evaluating the gas barrier pressure-sensitive adhesive sheets obtained in Examples 7 to 12, 16, and 17, one of the release sheets was removed, and a PET film having a thickness of 50 μm (adherend) was bonded to the exposed pressure-sensitive adhesive layer.

The other release sheet was then removed, and another PET film having a thickness of 50 μm (adherend) was bonded to the exposed pressure-sensitive adhesive layer.

The gas barrier pressure-sensitive adhesive sheets were cut to dimensions of 233×309 mm using a cutting machine ("Super Cutter PN1-600" manufactured by Ogino Seiki Co., Ltd.) to obtain samples.

The following tests were performed using each sample to evaluate the performance of each sample.

Water Vapor Transmission Rate

The water vapor transmission rate of each sample was measured using a water vapor transmission rate measurement apparatus ("L80-5000" manufactured by LYSSY) at a temperature of 40° C. and a relative humidity of 90%. The results are shown in Table 3.

Durability Test

Each sample was treated under the following treatment conditions. The state of the interface between the pressure-sensitive adhesive layer and the PET film of each sample are observed using a 10× loupe, and the durability was evaluated in accordance with the following criteria.

Acceptable: A change (e.g., lifting and delamination) was not observed at the interface between the pressure-sensitive adhesive layer and the PET film.

Fair: A small change (e.g., lifting and delamination) was observed at the interface between the pressure-sensitive adhesive layer and the PET film, and a slight change in color was observed.

Unacceptable: A change (e.g., lifting and delamination) was clearly observed at the interface between the pressure-sensitive adhesive layer and the PET film.

Treatment Conditions (1) Heat resistance test: The sample was allowed to stand at a temperature of 80° C. and a relative humidity of 10% or less for 200 hours.

(2) Humidity resistance test: The sample was allowed to stand at a temperature of 60° C. and a relative humidity of 95% for 200 hours.

(3) Heat shock test: The sample was allowed to stand at a temperature of −20° C. and a relative humidity of 10% or less for 30 minutes, and then allowed to stand at a temperature of 60° C. and a relative humidity of 10% or less for 30 minutes (one cycle). The above cycle was repeated 200 times.

Bending Test

The sample was bent at the center thereof, and passed between two rolls of a laminator ("LAMIPACKER LPC1502" manufactured by Fujipla, Inc.) at a laminating speed of 5 m/min and a temperature of 23° C. An arbitrary position of the center (bent part) of the bent sample was observed using a digital microscope ("DIGITAL MICROSCOPE VHX VH-450" manufactured by KEYENCE) at a magnification of 450. The sample was evaluated in accordance with the following criteria.

Very good: Microcracks were not observed.

Good: Microcracks were not observed, but a slight change in color was observed.

Poor: Microcracks having a dimension (width or length) of 5 μm or more were observed.

The evaluation results are shown in Table 3.

TABLE 3

| | Water vapor transmission rate (g/m²/day) | Heat resistance test | Humidity resistance test | Heat shock test | Bending test |
|---|---|---|---|---|---|
| Example 1 | 0.1 | Acceptable | Acceptable | Acceptable | Good |
| Example 2 | 0.1 | Acceptable | Acceptable | Acceptable | Very good |
| Example 3 | 0.1 | Acceptable | Acceptable | Acceptable | Very good |
| Example 4 | 0.1 | Acceptable | Acceptable | Acceptable | Very good |
| Example 5 | 0.1 | Acceptable | Acceptable | Acceptable | Good |
| Example 6 | 0.1 | Acceptable | Acceptable | Acceptable | Very good |
| Example 7 | 0.1 | Acceptable | Acceptable | Acceptable | Very good |
| Example 8 | 0.1 | Acceptable | Acceptable | Acceptable | Very good |
| Example 9 | 0.1 | Acceptable | Acceptable | Acceptable | Very good |
| Example 10 | 0.1 | Acceptable | Acceptable | Acceptable | Very good |
| Example 11 | 0.1 | Acceptable | Acceptable | Acceptable | Very good |
| Example 12 | 0.1 | Acceptable | Acceptable | Acceptable | Very good |
| Example 13 | 0.1 | Acceptable | Acceptable | Acceptable | Good |
| Example 14 | 0.1 | Acceptable | Acceptable | Acceptable | Good |

TABLE 3-continued

|  | Water vapor transmission rate (g/m²/day) | Heat resistance test | Humidity resistance test | Heat shock test | Bending test |
|---|---|---|---|---|---|
| Example 15 | 0.1 | Acceptable | Acceptable | Acceptable | Good |
| Example 16 | 0.05 | Acceptable | Acceptable | Acceptable | Good |
| Example 17 | 0.07 | Acceptable | Acceptable | Acceptable | Good |
| Example 18 | 0.05 | Acceptable | Acceptable | Acceptable | Good |
| Example 19 | 0.05 | Acceptable | Acceptable | Acceptable | Very good |
| Comparative Example 1 | 0.1 | Fair | Unacceptable | Unacceptable | Good |
| Comparative Example 2 | 0.1 | Unacceptable | Unacceptable | Unacceptable | Poor |

As is clear from Table 3, it was confirmed that the gas barrier pressure-sensitive adhesive sheets of Examples 1 to 19 including the pressure-sensitive adhesive layer having a storage modulus at 23° C. of $1.5 \times 10^4$ to $1.0 \times 10^7$ Pa exhibited excellent heat resistance, heat/humidity resistance, bendability, and durability as compared with the gas barrier pressure-sensitive adhesive sheets of Comparative Examples 1 and 2 including the pressure-sensitive adhesive layer of which the storage modulus at 23° C. and the storage modulus at 80° C. did not fall within the specified ranges.

The gas barrier pressure-sensitive adhesive sheets of Examples 16 and 17 including two gas barrier layers, and the gas barrier pressure-sensitive adhesive sheets of Examples 18 and 19 including the gas barrier layer obtained by implanting ions into the polymer compound, exhibited a particularly excellent gas barrier capability.

REFERENCE SIGNS LIST 1, 1a, 1b: gas barrier layer
2, 2a, 2b, 2c: pressure-sensitive adhesive layer
3a, 3b: release sheet
4, 4a, 4b: protective layer
5A, 5B, 5C, 5D: gas barrier pressure-sensitive adhesive sheet

The invention claimed is:

1. A gas barrier pressure-sensitive adhesive sheet comprising at least one gas barrier layer, at least one pressure-sensitive adhesive layer, and at least one release sheet, wherein the at least one pressure-sensitive adhesive layer has a storage modulus at 23° C. of $2.0 \times 10^4$ to $8.0 \times 10^4$ Pa and has a storage modulus at 80° C. of $7.8 \times 10^3$ to $2.3 \times 10^4$ Pa, the gas barrier pressure-sensitive adhesive sheet having a substantial thickness of 0.5 to 50 μm, and other than the release sheet, each layer included in the gas barrier pressure-sensitive adhesive sheet does not satisfy either requirement 1 or 2:

requirement 1: a paper or a plastic film having a thickness of 10 μm or more; and requirement 2: a plastic film having a tensile modulus at 23° C. of 200 to 5000 MPa.

2. The gas barrier pressure-sensitive adhesive sheet according to claim 1, the gas barrier pressure-sensitive adhesive sheet having a water vapor transmission rate at a temperature of 40° C. and a relative humidity of 90% of 0.1 g/m²/day or less.

3. The gas barrier pressure-sensitive adhesive sheet according to claim 1, wherein the at least one pressure-sensitive adhesive layer is formed of a pressure-sensitive adhesive that includes a silane coupling agent or an alkoxy metal compound.

4. The gas barrier pressure-sensitive adhesive sheet according to claim 1, further comprising a protective layer.

5. The gas barrier pressure-sensitive adhesive sheet according to claim 1, the gas barrier pressure-sensitive adhesive sheet being a pressure-sensitive adhesive sheet for an electronic member or an optical member.

* * * * *